United States Patent
Portnoy et al.

(10) Patent No.: US 10,936,985 B2
(45) Date of Patent: Mar. 2, 2021

(54) COMPUTERIZED WORKFORCE MANAGEMENT SYSTEM FOR IMPROVING AN ORGANIZATION'S CAPACITY TO FULFILL ITS MISSION

(71) Applicant: Avantgarde LLC, Rockville, MD (US)

(72) Inventors: Gregory Portnoy, Potomac, MD (US); Rebecca Ann Contreras, Hutto, TX (US)

(73) Assignee: Avantgarde LLC, Rockville, MD (US)

( * ) Notice: Subject to any disclaimer, the term of this patent is extended or adjusted under 35 U.S.C. 154(b) by 0 days.

(21) Appl. No.: 15/997,762

(22) Filed: Jun. 5, 2018

(65) Prior Publication Data

US 2019/0066011 A1    Feb. 28, 2019

Related U.S. Application Data

(60) Provisional application No. 62/550,662, filed on Aug. 27, 2017.

(51) Int. Cl.
| | | |
|---|---|---|
| G06Q 10/06 | (2012.01) | |
| G06Q 10/10 | (2012.01) | |
| G06Q 30/02 | (2012.01) | |

(52) U.S. Cl.
CPC ....... *G06Q 10/0637* (2013.01); *G06Q 10/067* (2013.01); *G06Q 10/06312* (2013.01);
(Continued)

(58) Field of Classification Search
CPC .................................................. G06Q 10/06
See application file for complete search history.

(56) References Cited

U.S. PATENT DOCUMENTS

| | | |
|---|---|---|
| 6,049,776 A | 4/2000 | Donnelly |
| 6,311,192 B1 | 10/2001 | Rosenthal |

(Continued)

*Primary Examiner* — Kurtis Gills
(74) *Attorney, Agent, or Firm* — David E. Boundy; Cambridge Technology Law LLC

(57) ABSTRACT

A computer program programmed to assist management of a group in deploying, training, hiring, and firing staff and other resources of the group. The program builds a model of a group, the model including the organizational structure, missions, and tasks that the group performs to achieve its missions. The program queries managers of a group to obtain the managers' requested levels for a plurality of resources for the group, including requested levels of proficiency for a plurality of competencies. The program queries staff members of the group to obtain staff assessments of the degree to which the group meets the requested levels and competencies. The program compares the managers' requested levels and the staff assessments to identify mismatches between the requests and assessments, and reports those mismatches to the managers, for example, in the form of suggestions for training of staff. The program may perturb the model to reflect a change of a requirement imposed on the group. The computer may receive or develop of adaptations in the model to reflect adaptations to the group to respond to the changed imposed requirement. The program may perform adaptive modeling or optimization of the model to discover a desirable set of adaptations for implementation by the group to respond to the changed imposed requirement.

27 Claims, 46 Drawing Sheets

(52) U.S. Cl.
CPC ............... *G06Q 10/06398* (2013.01); *G06Q 10/063118* (2013.01); *G06Q 10/105* (2013.01); *G06Q 30/0201* (2013.01)

(56) References Cited

U.S. PATENT DOCUMENTS

| | | |
|---|---|---|
| 7,305,392 B1 | 12/2007 | Abrams |
| 7,672,861 B2 | 3/2010 | Al-Otaibi |
| 8,335,705 B2 | 12/2012 | Ehrler |
| 9,015,076 B1 | 4/2015 | Naik |
| 9,471,900 B1 | 10/2016 | Boustany |
| 2003/0126141 A1 | 7/2003 | Hassman |
| 2003/0182173 A1 | 9/2003 | D'Elena |
| 2004/0093351 A1 | 5/2004 | Lee |
| 2004/0220825 A1 | 11/2004 | Schwerin-Wenzel |
| 2006/0294197 A1* | 12/2006 | Mital ............... G06Q 10/06 709/217 |
| 2008/0052203 A1* | 2/2008 | Beyer ............... G06Q 10/087 705/28 |
| 2009/0006164 A1 | 1/2009 | Kaiser |
| 2011/0015958 A1 | 1/2011 | April |
| 2012/0232944 A1 | 9/2012 | Zhu |
| 2013/0103749 A1* | 4/2013 | Werth ............... G06F 9/5072 709/203 |
| 2013/0290063 A1 | 10/2013 | Diaz |
| 2015/0025929 A1* | 1/2015 | Abboud ........... G06Q 30/0613 705/7.15 |
| 2015/0106145 A1 | 4/2015 | Hamilton |
| 2017/0061383 A1 | 3/2017 | Miyauchi |
| 2017/0091694 A1 | 3/2017 | Gan |

\* cited by examiner

Organizational Model Graph

ORGANIZATION | OFFICE OF DIRECTOR | INFORMATION SECURITY | CONSTRUCTION DIVISION | HARDWARE MAINTENENCE

| Function Name ⌐342 | Function Description | Branch ⌐344 | Impact Category ⌐346 | Performance ⌐348 | Quantity | Edit |
|---|---|---|---|---|---|---|
| Maintain utilities of the office Complex during all construction activities | Maintain utilities of the office Complex during all construction activities | Construction Division | Critical | Satisfactory | 0 | ✎ |
| Install, repair, and maintain the physical utilities systems used to safeguard the office Complex. | Install, repair, and maintain the physical utilities systems used to safeguard the office Complex. | Firewall Section | Critical | Satisfactory | 0 | ✎ |
| Provide a secure environment for the Board to discuss classified information - TCCS | Provide a secure environment for the Board to discuss classified information - TCCS | Laptop Maintenance Section | Critical | Satisfactory | 0 | ✎ |
| Provide oversight of all utilities measures for the Alternate Computer Facility (ACF) | Provide oversight of all utilities measures for the Alternate Computer Facility (ACF) | Construction Division | Critical | Satisfactory | 0 | ✎ |
| Manage the Operations of the dept | Manage the operations of the dept | Office of Director | Critical | Satisfactory | 0 | ✎ |
| Provide for the design, installation, and maintenance of all physical utilities systems | Provide for the design, installation, and maintenance of all physical utilities systems | Project Planning Section | Critical | Satisfactory | 0 | ✎ |
| Provide a secure environment for the Board to discuss classified information - Component Detection | Provide a secure environment for the Board to discuss classified information - Component Detection | Component Maintenance Section | Essential | Satisfactory | 0 | ✎ |

FIG. 3(b)

ORGANIZATION | OFFICE OF DIRECTOR | INFORMATION SECURITY | CONSTRUCTION DIVISION | HARDWARE MAINTENENCE

| Mission (350) | Function Name (352) | Function Description | Branch (354) | Impact Category (356) | Performance (358) | Quantity | Edit |
|---|---|---|---|---|---|---|---|
| Manage the Operations of the dept | Complete Strategic Planning and Force Development | Complete Strategic Planning and Force Development | Office of Director | Essential | Need Improvement | 0 | ✏ |
| Manage the Operations of the dept | Evaluate the impact of new technology on existing systems and emerging outages - Front Office | Evaluate the impact of new technology on existing systems and emerging outages | Office of Director | Essential | Need Improvement | 0 | ✏ |
| Manage the Operations of the dept | Oversee and Coordinate Ongoing Work, Including Special Projects | Oversee and Coordinate Ongoing Work of the office, Including Special Projects | Office of Director | Essential | Satisfactory | 0 | ✏ |
| Manage the Operations of the dept | Manage Budget / Procurement Activities | Manage Budget / Procurement Activities | Office of Director | Essential | Satisfactory | 0 | ✏ |
| Manage the Operations of the dept | Manage Administrative Areas | Manage Administrative Areas (supply and equipment management, space management, human resources, etc.) | Office of Director | General | Satisfactory | 0 | ✏ |
| Manage the Operations of the dept | Manage contracts and performance of employees | Manage contracts and performance of employees | Office of Director | General | Satisfactory | 0 | ✏ |
| Manage Budget/ Procurement Activities | Complete Budget Activities/ Tasks Delegated by the Office of Financial Management | Complete budget activities/ tasks delegated by the Office of Financial Management | Office of Director | Essential | Satisfactory | 0 | ✏ |
| Manage Budget/ Procurement Activities | Complete Procurement Activities/Tasks Delegated by the Office of Financial Management | Complete Procurement activities/tasks delegated by the Office of Financial Management | Office of Director | General | Need Improvement | 0 | ✏ |

FIG. 3(c)

| ORGANIZATION | OFFICE OF DIRECTOR | INFORMATION SECURITY | CONSTRUCTION DIVISION | HARDWARE MAINTENENCE | | |
|---|---|---|
| Activity | Activity Description | Edit |
| Gather Information | Attend meetings with AoC and contractors to gather information on method and means to advise utilities risks/requirements for the utilities plan |  |
| Assist with System Placement | Assist with the placement of all utilities-related systems end equipment |  |
| Develop Life-Cycle Replacement Program to Upgrade Systems | Develop life-cycle replacement programs to upgrade all physical utilities systems on a scheduled basis |  |
| Coordinate Systems and Equipment | Coordinate utilities systems and equipment for Members offices and support space |  |
| Supervise Installation Contractors | Supervise installation contractors |  |
| Ensure that the work of the contractors is consistent with UUPP long-term plans | Ensure that the work of the contractors is consistent with UUPP long-term plans |  |
| Inspect and recommend acceptance/rejection of completed work | Inspect and recommend acceptance/rejection of completed work |  |
| Conduct Site Surveys/Collect Requirements | Conduct site surveys/collect requirements |  |
| Develop Statements of Work | Develop statements of work |  |
| Develop Design Documents | Develop design documents |  |
| Develop Engineering Specifications | Develop engineering specifications |  |
| Develop and Manage Schedules | Develop and manage schedules |  |

FIG. 3(d)

ORGANIZATION | OFFICE OF DIRECTOR | INFORMATION SECURITY | CONSTRUCTION DIVISION | HARDWARE MAINTENENCE

| Function ⌐360 | Activity ⌐362 | Activity Description ⌐364 | Impact Category ⌐366 | Time | Edit |
|---|---|---|---|---|---|
| Develop and monitor plans to maintain utilities during all construction activities | Gather Information | Attend meetings with AoC and contractors to gather information on method and means to advise utilities risks/requirements for the utilities plan | Essential | 1040 | ✎ |
| Develop and monitor plans to maintain utilities during all construction activities | Inspect and recommend utilities measures to mitigate outages | Inspect and recommend utilities measures to mitigate outages | Critical | 1040 | ✎ |
| Develop and monitor plans to maintain utilities during all construction activities | Create physical and operational utilities plans for construction projects | Create physical and operational utilities plans for construction projects | Critical | 400 | ✎ |
| Develop and monitor plans to maintain utilities during all construction activities | Advocate utilities imperatives to the Architect of the office and contractors | Advocate utilities imperatives to the Architect of the office and contractors | Critical | 52 | ✎ |
| Develop and monitor plans to maintain utilities during all construction activities | Review and approve all proposed changes prior to implementation | Review and approve all proposed changes prior to implementation | Critical | 104 | ✎ |
| Develop and monitor plans to maintain utilities during all construction activities | Provide technical expertise for construction design and activities | Provide technical expertise for construction design and activities | Critical | 104 | ✎ |
| Develop and monitor plans to maintain utilities during all construction activities | Conduct construction utilities inspections to ensure compliance with utilities requirements | Conduct construction utilities inspections to ensure compliance with utilities requirements | Critical | 1040 | ✎ |
| Conduct roving monitoring of assigned facility | monitoring parking lot, inner and outer perimeter, and grounds | monitoring parking lot, inner and outer perimeter, and grounds | Critical | 2190 | ✎ |

FIG. 3(e) page A

ORGANIZATION | OFFICE OF DIRECTOR | INFORMATION SECURITY | CONSTRUCTION DIVISION | HARDWARE MAINTENENCE

| Function ⌐360 | Activity ⌐362 | Activity Description | Impact Category ⌐364 | Time ⌐366 | Edit |
|---|---|---|---|---|---|
| Conduct roving monitoring of assigned facility | Maintain constant foot monitoring Internal and external to the facility | Maintain constant foot monitoring Internal and external to the facility | Critical | 8760 |  |
| Conduct roving monitoring of assigned facility | Ensure doors and external windows are secure | Ensure doors and external windows are secure | Critical | 3285 |  |
| Conduct roving monitoring of assigned facility | Respond to alarms and provide direction to visitors and staff | Respond to alarms and provide direction to visitors and staff | Critical | 2740 |  |

FIG. 3(e) page B

ORGANIZATION | OFFICE OF DIRECTOR | INFORMATION SECURITY | CONSTRUCTION DIVISION | HARDWARE MAINTENENCE

| Description | Group 370 | Edit 372 |
|---|---|---|
| Situational Awareness | Fundamental Competencies |  |
| Troubleshooting Ability | Fundamental Competencies |  |
| Interpersonal skill | Fundamental Competencies |  |
| Interpersonal Skills | Fundamental Competencies |  |
| Written Communication | Fundamental Competencies |  |
| Written Communication | Fundamental Competencies |  |
| Collaboration | Fundamental Competencies |  |
| Verbal Communication | Fundamental Competencies |  |
| Spreadsheet/Database Ability | Fundamental Competencies |  |
| Verbal Communication | Fundamental Competencies |  |
| Attention to Detail | Fundamental Competencies | |
| Situational Awareness | Fundamental Competencies |  |

FIG. 3(f)

ORGANIZATION | OFFICE OF DIRECTOR | INFORMATION SECURITY | CONSTRUCTION DIVISION | HARDWARE MAINTENENCE

| Activity (374) | Competance (376) | Level | Group (378) | Edit |
|---|---|---|---|---|
| Conduct Market Research and Gather Pricing Information | Physical and Technical Security Requirements, Systems and Equipment | Advanced | Technical Competencies |  |
| Conduct Market Research and Gather Pricing Information | Project Management | Advanced | Technical Competencies |  |
| Conduct Market Research and Gather Pricing Information | Analytical Reasoningt | Advanced | Technical Competencies |  |
| Conduct Market Research and Gather Pricing Information | Appropriation Law | Advanced | Technical Competencies |  |
| Conduct Market Research and Gather Pricing Information | Program Management | Advanced | Technical Competencies |  |
| Conduct Market Research and Gather Pricing Information | Attention to Detail | Advanced | Technical Competencies |  |
| Create and Approve Training and Travel Authorizations | Critical Evaluation | Advanced | Technical Competencies |  |
| Create and Approve Training and Travel Authorizations | Analytical Reasoning | Advanced | Technical Competencies |  |
| Review Capitalized Asset Listing | Critical Evaluation | Advanced | Technical Competencies |  |
| Review Capitalized Asset Listing | Analytical Reasoning | Advanced | Technical Competencies |  |
| Develop Business Cases | Verbal Communication | Advanced | Fundamental Competencies |  |
| Develop Business Cases | Analytical Reasoning | Advanced | Technical Competencies |  |

FIG. 3(g)

Activities

Security Accreditation Section

| Activity | % Time Spent | Impact Category |
|---|---|---|
| Liaise with Representatives on Changes in the Physical utilities Field | | |
| Collaborate with Partner Law Enforcement Agencies to Share/Gather Best Practices | | Select Impor ▼ |
| Gather outage Assessment Information and Crime Data | | Select Impor ▼ |
| Meet with Vendors and Evaluate Emerging Technology | | Select Impor ▼ |
| Provide Special Event utilities | | |
| Design Covert flooring Technologies | | Select Impor ▼ |
| Implement Covert flooring Technologies | | Select Impor ▼ |
| Conduct Surveys | | Select Impor ▼ |
| Attend Meetings | | Select Impor ▼ |
| Implement Physical utilities Technologies | | Select Impor ▼ |
| Design Physical utilities Technologies | | Select Impor ▼ |
| Design Perimeter utilities | | Select Impor ▼ |
| Coordinate Perimeter utilities | | Select Impor ▼ |

FIG. 4(a)

Competencies

Please rate your proficiency in each of the following areas

| Legend |
|---|
| • Not Applicable - You are not required to apply or demonstrate this competency as a part of the job. This competency is not applicable to your position.<br>• Fundamental Awareness - You have a common knowledge or an understanding of basic techniques and concepts.<br>• Novice - You have the level of experience gained in a classroom and/or experimental scenarios or as a trainee on-the-job. You are expected to need help when performing this skill.<br>• Intermediate - You are able to successfully complete tasks in this competency as requested. Help from an expert may be required from time to time, but you can usually perform the skill independently.<br>• Advanced - You can perform the actions associated with this skill without assistance. You are recognized within your immediate organization as a "person to ask" when difficult questions arise regarding this skill.<br>• Expert - You are known as an expert in this area. You can provide guidance, troubleshoot and answer questions related to this area of expertise. |

Fundamental Competencies

Attention to Detail

○ N/A  ○ Fundamental Awareness  ○ Novice  ○ Intermediate

○ Advanced  ○ Expert

Collaboration

○ N/A  ○ Fundamental Awareness  ○ Novice  ○ Intermediate

○ Advanced  ○ Expert

FIG. 4(b)

Multiple Choice Questions

Note: The results from this section will be consolidated and reported separately from the previous sections.

Please indicate the extent to which you agree with the following statements.

1. I understand the mission of my section

◯ strongly disagree  ◯ disagree  ◯ neither agree nor disagree  ◯ agree  ◯ strongly agree 2. I understand what is expected of me at work ◯ strongly disagree  ◯ disagree  ◯ neither agree nor disagree  ◯ agree  ◯ strongly agree 3. I am able to meet expectations at work ◯ strongly disagree  ◯ disagree  ◯ neither agree nor disagree  ◯ agree  ◯ strongly agree
   If you do not agree with this statement, please explain why (600 character text response)

4. I am equipped with the resources and tools needed to perform my work

◯ strongly disagree  ◯ disagree  ◯ neither agree nor disagree  ◯ agree  ◯ strongly agree
   If you do not agree with this statement, please explain why (600 character text response)

FIG. 4(c) page A

5. I receive feedback on my performance

○ strongly disagree ○ disagree ○ neither agree nor disagree ○ agree ○ strongly agree
If you do not agree with this statement, please explain why (600 character text response)

6. What are the top three priorities of your section?

7. In what areas (competencies and skills) does Demo need more qualified resources to meet customer demands?

8. From where you sit in your role, what works well within Demo?

FIG. 4(c) page B

Survey Results - HERNANDEZ, Caden

Activities

| Activity | % Time Spent | Impact Category |
|---|---|---|
| Manage physical and technical projects in all Terminal Rooms in and around the office Complex | | |
| Develop Project Management Documents | 2 | Critical |
| Develop and maintain utilities infrastructure master plan | 0 | Critical |
| Support and develop designs, engineering specifications, and statements of work | 2 | Critical |
| Provide Installation services for utilities systems | | |
| Install utilities systems infastructure | 0 | Critical |
| Install and terminate copper, fiber optic cable, and coax cabling | 0 | Critical |
| Install utilities equipment and door hardware | 0 | Critical |
| Program and configure utilities equipment | 0 | Critical |
| Coordinate installations of systems with the Physical utilities Division and stakeholders | 3 | Critical |
| Provide PPS Program Management and Contract Support | | |
| Provide morning, weekly, monthly, and quarterly reports | 2 | Essential |
| Perform inventory management | 0 | Essential |
| Attend a quarterly meeting with the UUPP Contracting Officer | 1 | Essential |
| Conduct QA/QC Reviews | 2 | Critical |
| Evaluate the impact of new technology on existing systems and emerging outages | | |
| Identify / Lead Design Improvement Activities | 0 | Essential |

FIG. 4(d)

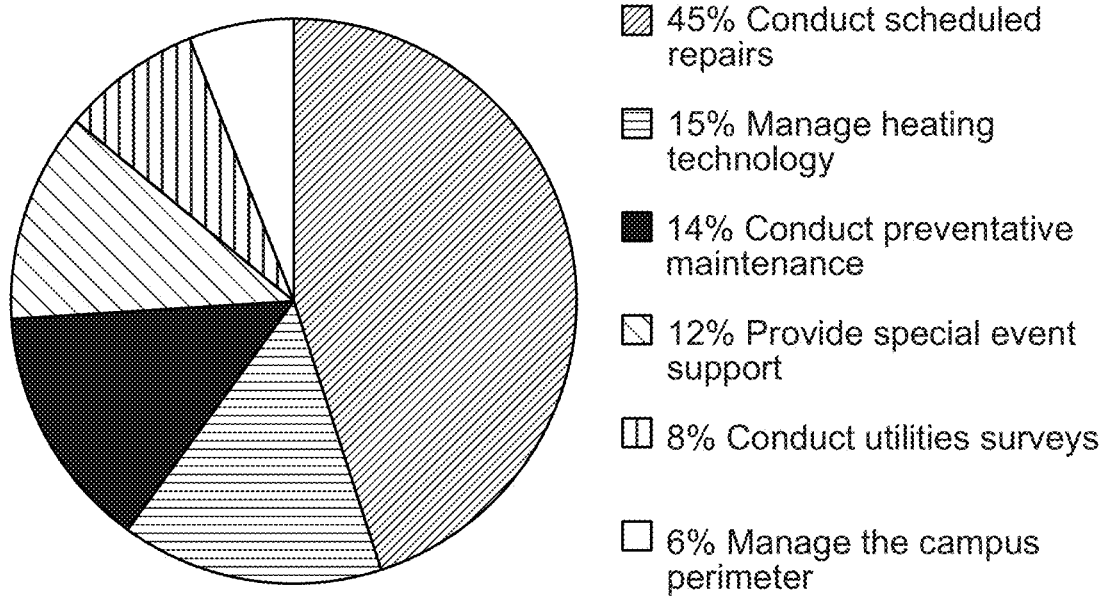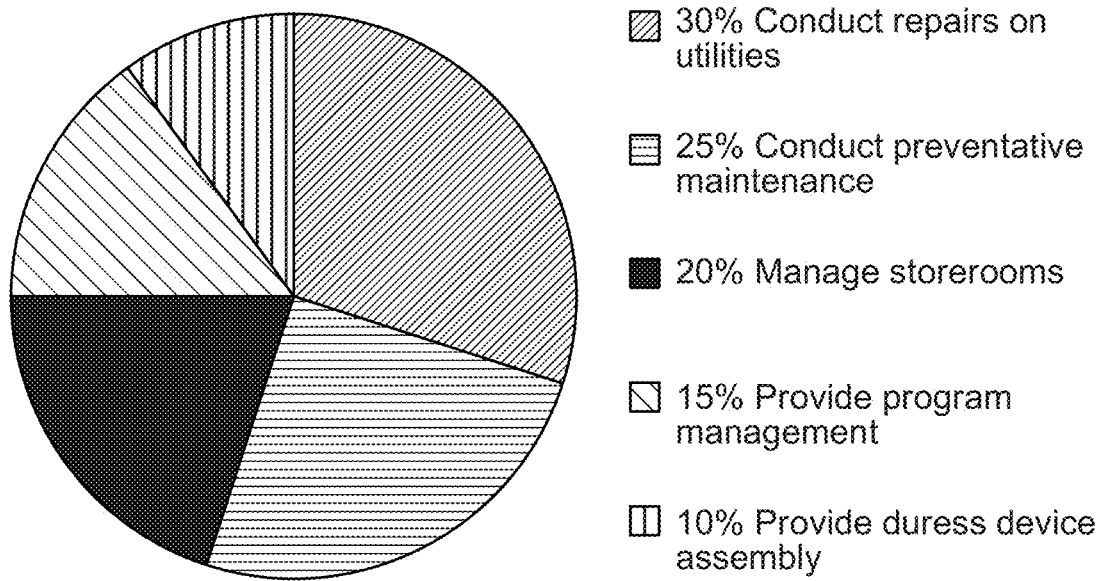
FIG. 5(i)

| Function | Est. Number FTEs | Number FTEs | Number of Employees | |
|---|---|---|---|---|
| System Operations Section | | | 6/1/0 | |
| Manage and configure HR IDS Database | 3.28 | 1.64 | 7 | 82%/18%/0% |
| Program and update the HR Duress system | 0.98 | 0.79 | 5 | 99%/1%/0% |
| Provide SAS program management and contact support | 0.74 | 0.36 | 7 | 94%/6%/0% |
| Evaluate the impact of new technology on existing systems and emerging outages - SAS | 0.96 | 0.46 | 4 | 87%/13%/0% |
| Administer, maintain, and ensure the integrity of the overall utilities network | 8.81 | 1.75 | 7 | 85%/15%/0% |
| Manage physical and technical projects in all Terminal Rooms in and around the office Complex - SAS | 2.96 | 0.06 | 3 | 83%/17%/0% |
| Program, maintain, and update all utilities management systems | 6.47 | 1.97 | 7 | 75%/25%/0% |
| Manage the Genetec (video management system) | 2.71 | 0.99 | 7 | 99%/1%/0% |

FIG. 5(j) page A

| Function | Est. Number FTEs | Number FTEs | Number of Employees | 4/6/20 |
|---|---|---|---|---|
| Project Planning Section | | | | |
| Evaluate the impact of new technology on existing systems and emerging outages | 0.96 | 0.54 | 8 | 63%/37%/0% |
| Manage physical and technical projects in all Terminal Rooms in and around the office Complex | 2.96 | 0.43 | 25 | 42%/12%/47% |
| Provide installation services for utilities systems | 15 | 12.52 | 23 | 1%/0%/99% |
| Test and Certify Installations and Equipment | 12.75 | 6.19 | 23 | 3%/0%/97% |
| Provide PPS Program Management and Contract Support | 0.71 | 1.48 | 25 | 9%/10%/81% |
| Design and Manage Projects | 5.66 | 4.35 | 10 | 26%/74%/0% |

FIG. 5(j) page B

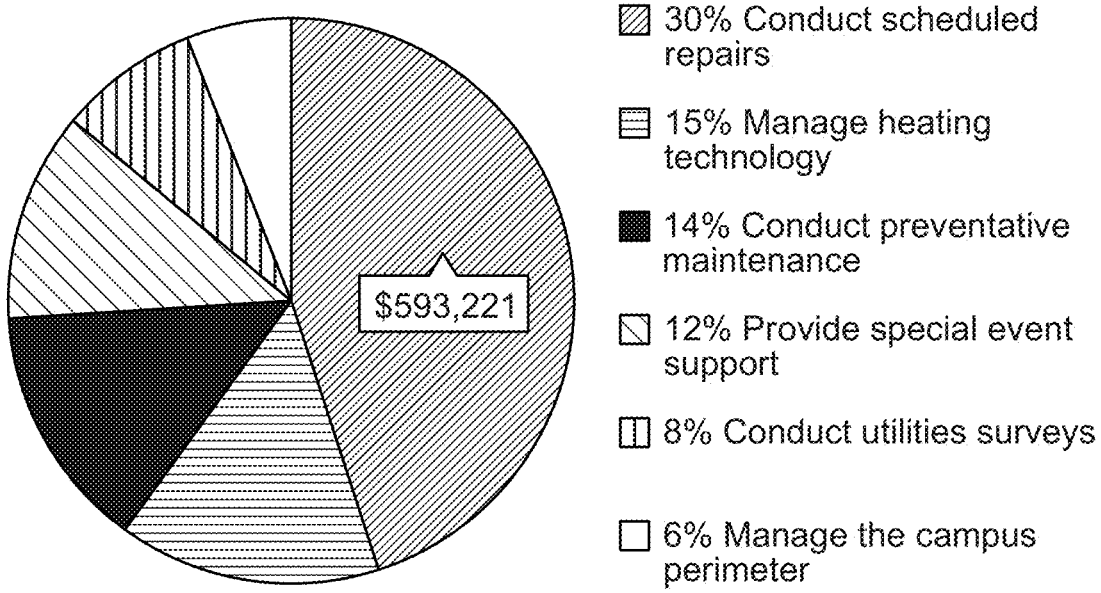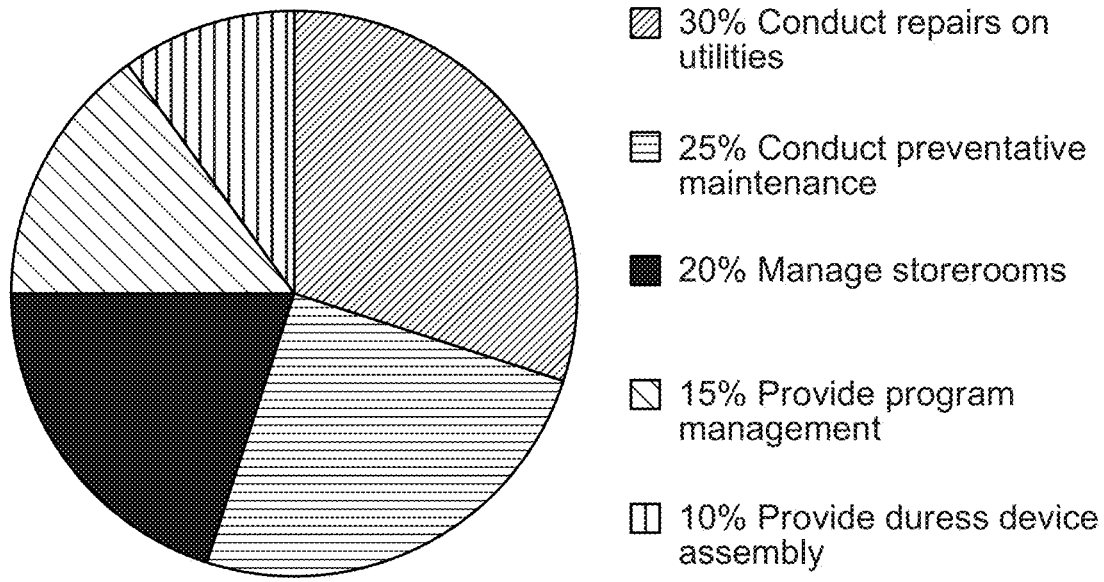
FIG. 5(k)

| Function | Est. Cost | Cost | Number of Employees | |
|---|---|---|---|---|
| System Operations Section | | | | 6/1/0 |
| Manage and configure HR IDS Database | $611,984 | $306,041 | 7 | 82%/18%/0% |
| Program and update the HR Duress system | $148,245 | $119,851 | 5 | 99%/1%/0% |

FIG. 5(I)

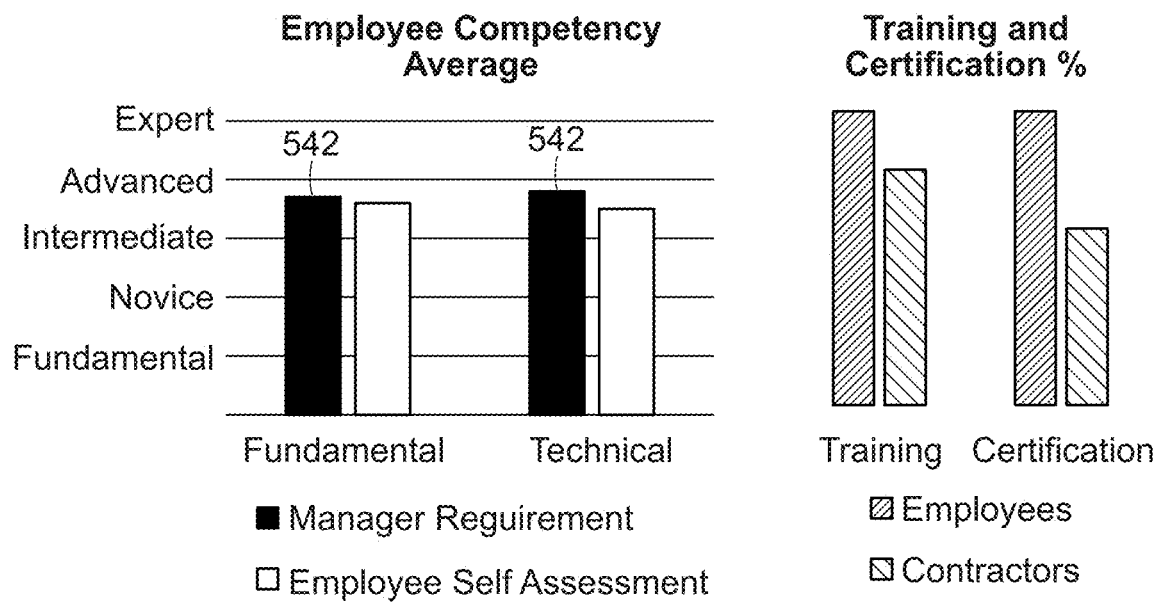
FIG. 5(m)
FIG. 5(n)
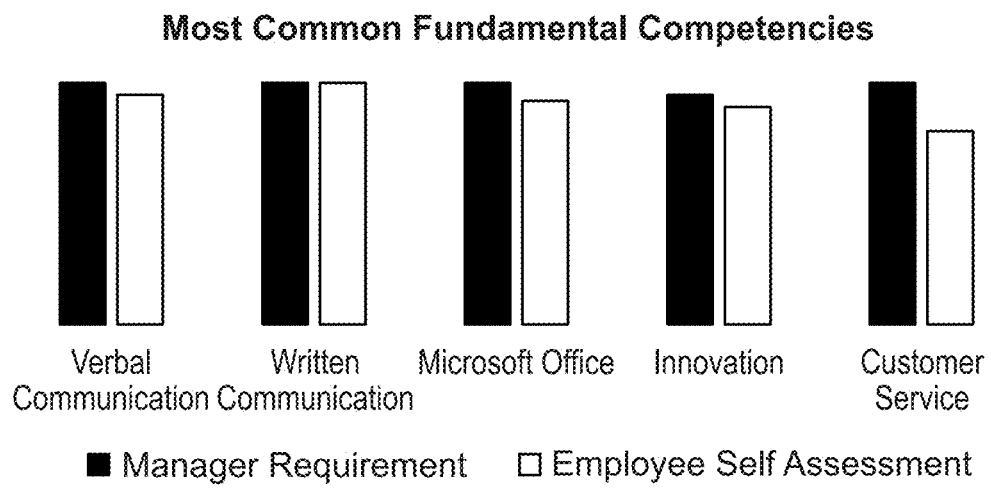
FIG. 5(o)

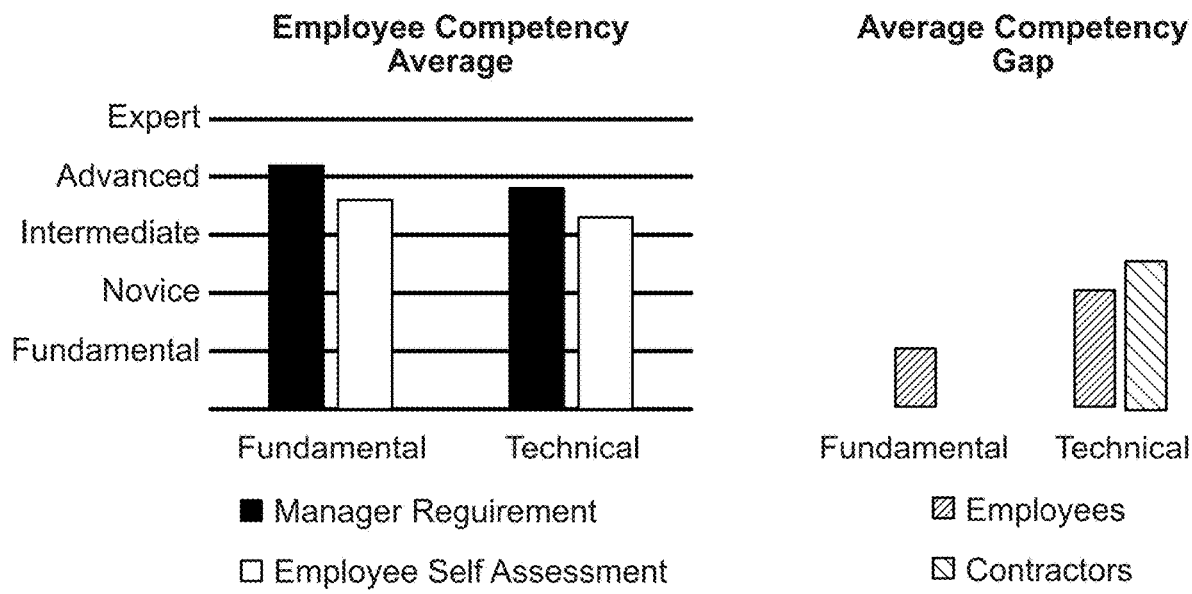
FIG. 5(p)
FIG. 5(q)
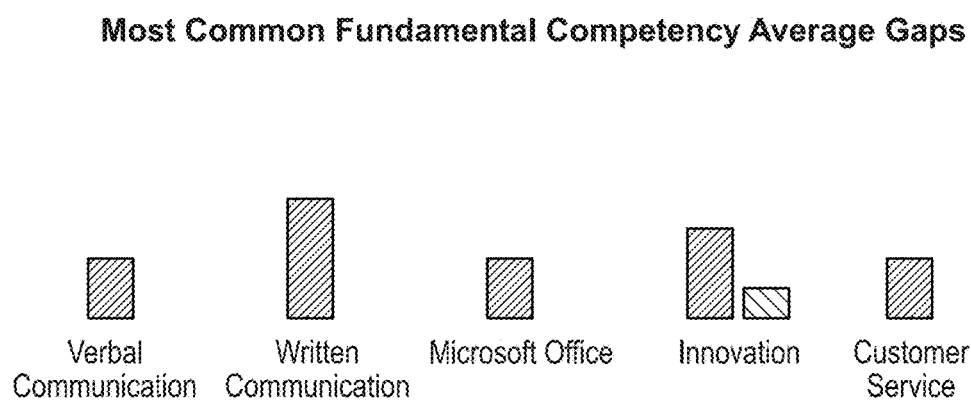
FIG. 5(r)

FIG. 6

Mission Risk Exposure

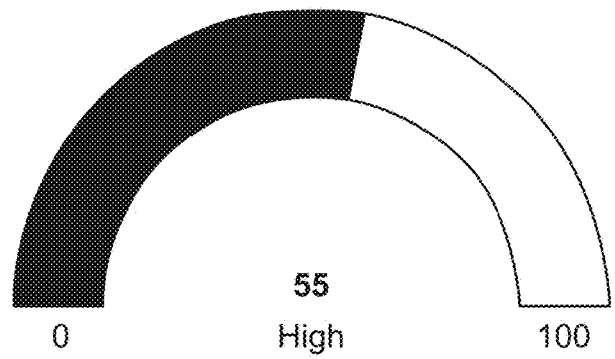

55
0    High    100

Impact of Function's Exposure on Division's Mission

| Function's Category | 25% Impact | 50% Impact | 75% Impact | Full Impact |
|---|---|---|---|---|
| Critical | No Imp ▼ | No Imp ▼ | No Imp ▼ | $ ▼ |
| Essential | No Imp ▼ | No Imp ▼ | No Imp ▼ | No Imp ▼ |
| General | No Imp ▼ | No Imp ▼ | No Imp ▼ | No Imp ▼ |

Functions

| Function | Mission Impact Category | Level of Exposure |
|---|---|---|
| System Operations Section | | |
| Manage and configure HR IDS Database | Critical | 40%Exposed ▼ |
| Program and update the HR Duress system | Critical | 20%Exposed ▼ |
| Provide SAS program management and contract support | Essential | 20%Exposed ▼ |
| Evaluate the impact of new technology on existing systems and emerging outages - SAS | Critical | 30%Exposed ▼ |
| Administer, maintain, and ensure the integrity of the overall utilities network | Critical | 60%Exposed ▼ |

Predictive Modeling

Reduction Target (%):  !  | 15 | — 711

Modeling Criteria

- ⦿ ! Even spread — 712
- ○ ! Retirement Eligibility — 716
- ○ ! Institutional Knowledge — 713
- ○ ! Criticality — 714

- ○ ! Buy-out Campaign — 717
  *(Based on retirement eligibility)*
- ○ ! Early Retirement Campaign — 718
  *(Based on retirement eligibility)*

[ Start PM session ]

FIG. 7(a)

Predictive Modeling: Budget Analysis TOP OF THE ORG

Labor Cost

|  | Estimated (722) | Actual (724) | Projected (726) |
|---|---|---|---|
| TOP OF THE ORG | $183,176,304 | $5,469,019 | 0.0 |
| *Divisions* | | | |
| Physical Security Division | $40,679,796 | $3,181,008 | 31810 |
| Construction Security Division | $1,655,776 | $343,088 | 34308 |
| Technical Countermeasures Division | $112,954,512 | $1,494,648 | 14946 |
| Office of Director | $27,886,224 | $450,275 | 45027 |

FIG. 7(b)

Functions

Employee Assignments

| Employees List | % Current | % Projected |
|---|---|---|
| Current ←742 | | ←744 |
| DOW, JOHN | 0.15% | |
| JOHNSON, BRETT | 0.07% | |
| COOPER, GARY | 0.25% | |
| SHWAB, CHARLES | 0.37% | |
| New | | |
| JONES, LOGAN | | |
| MOORE, NEAL | | |
| MARTINEZ, MIA | | |

FIG. 7(d)

*Predictive Modeling : Model*

ROOT

TOP OF THE ORG

Target Adjustment : 15%

| Case | Achieved Adjustment | Headcount | Critical Functionality Support Lose Score | Institutional Knowledge Lose Score |
|---|---|---|---|---|
| Case 1 ● | -15.1($4,876,195) | -8 | 76 | 12 |
| Case 2 ○ | -15.3($4,643,197) | -8 | 64 | 41 |
| Case 3 ○ | -14.7($4,986,949) | -7 | 81 | 33 |
| Case 4 ○ | -15.6($4,801,195) | -8 | 25 | 25 |
| Case 5 ○ | -15.2($4,864,195) | -8 | 47 | 08 |

Show Impact Summary    START NEW

FIG. 7(e) page A

|  | Estimated | Reported | Targeted | Achieved |
|---|---|---|---|---|
|  | $16,411,696 | $5,469,019 | 4648 | $4,840,717 ($192,050) |
|  | | | ($-820,352) | |
| Divisions | | 758 | | 759 |
| Office of Director | $2,891,297 | $450,275 | | 4502 |
| Construction Division | $394,688 | $343,088 | | 2379 |
| Hardware Maintenance Division | $6,554,250 | $1,494,648 | | 1371 |
| Information Security Division | $6,571,461 | $3,181,008 | | 2780 |
|  | | | | FTE |

Employee

757

762 — Recalculate

FIG. 7(e) page B

Functions

| Functions With Fulfilled Time Allocation | 64 | —764 |
|---|---|---|
| Functions With Insufficient Time Allocation | 17 | —765 |
| Functions With Excess of Time Allocation | 8 | —766 |

Employees

| Employees With Fully Utilized Time Resource | 266 | —767 |
|---|---|---|
| Employees With Under-Utilized Time Resource | 33 | —768 |
| Employees With Over-Utilized Time Resource | 16 | —769 |
| Employee Time Utilization || |
| Name | % ||
| DOW, JOHN | 0.95% ||
| JOHNSON, BRETT | 1.23% ||
| COOPER, GARY | 1.00% ||
| SHWAB, CHARLES | 1.00% ||
| JONES, LOGAN | 1.04% ||
| MOORE, NEAL | 0.67% ||

FIG. 7(f)

*Predictive Modeling : Impact*

ROOT

TOP OF THE ORG

*Target Adjustment : 15%    Achieved Adjustment : -14.7%*
*Adjustment Count: 7*

[ Back to Model ]  [ START NEW ]

Construction Division —771

| Employee | 772 In/Out |
|---|---|
| ANDERSON, Zoe ($105,147) | ⏻ |

| Function | Total FTE (loss) |
|---|---|
| Develop and monitor plans to maintain utilities during all construction activities | 1.1 (0.7) |
| Coordinate all operational utilities efforts with relevant stakeholders for all ongoing construction | 0.3 (0.3) |

Security Accreditation Section —771

| Employee | 772 In/Out |
|---|---|

| Function | Total FTE (loss) |
|---|---|
| Manage the Campus Perimeter utilities Force Protection Program | 0.64 (0.07) |
| Provide Special Event utilities | 3.36 (0.28) |
| Liaise with Representatives on Changes in the Physical utilities Field | 0.69 (0.11) |
| Serve as Program Coordinator for the Vehicle station/engine Maintenance Contract | 0.62 (0.07) |
| Serve as Members of Working Groups and Subcommittees for the Interagency utilities Committee | 0.51 (0.03) |
| Manage heating Technology | 0.41 (0.04) |

FIG. 7(g) page A

| | |
|---|---|
| Conduct scheduled and emergency repairs of all operable vehicle stations | 0.91 (0.01) |
| Support Special utilities Events | 0.27 (0.01) |
| Provide Program Support | 0.54 (0.03) |
| Evaluate the impact of new technology on existing systems and emerging outages - SCS | 0.19 (0.03) |
| Conduct utilities Surveys and Assessments | 2.04 (0.32) |

Firewall Section — 771

| Employee | In/Out |
|---|---|
| MOORE, Lily ($92,367) | 772 |
| THOMPSON, Liam ($139,621) | |

| Function | Total FTE (loss) |
|---|---|
| Provide SES Program Management and Contract Support | 8.42 (0.54) |
| Manage and maintain high utilities locks | 1.18 (0.2) |
| Manage storerooms and storage spaces | 6.94 (0.05) |
| Evaluate the impact of new technology on existing systems and emerging outages - SES | 0.88 (0.08) |
| Conduct preventative maintenance and inspections of physical utilities systems and equipment | 11.73 (0.42) |
| Manage physical and technical projects in all Terminal Rooms in and around the office Complex - SES | 0.28 (0.05) |
| Conduct repairs on all physical utilities systems and equipment | 11.77 (0.51) |
| Provide support and deploy specialized utilities equipment for special events | 1.86 (0.15) |

FIG. 7(g) page B

FIG. 7(g) page C

System Operations Section

| Employee | In/Out |
|---|---|
| JONES, Emma ($110,604) | ⏻ |

| Function | Total FTE (loss) |
|---|---|
| Provide SAS program management and contract support | 0.16 (0.09) |
| Evaluate the impact of new technology on existing systems and emerging outages - SES | 0.23 (0.11) |
| Administer, maintain, and ensure the integrity of the overall utilities network | 1.6 (0.46) |
| Manage physical and technical projects in all Terminal Rooms in and around the office Complex - SAS | 0.03 (0.03) |
| Program, maintain, and update all utilities management systems | 1.65 (0.23) |
| Manage the Genetec (video management system) | 1.22 (0.08) |

Desktop Maintenance Section

| Employee | In/Out |
|---|---|
| JONES, Lucas ($123,884) | ⏻ |
| MOORE, Noah ($109,042) | ⏻ |

| Function | Total FTE (loss) |
|---|---|
| Conduct Construction utilities Projects - RFAS | 0.22 (0.27) |
| Conduct, assist with, or lead TSCM Missions - RFAS | 0.57 (0.45) |
| Research emerging countermeasures vulnerabilities and countermeasures equipment - RFAS | 0.19 (0.15) |
| Maintain, configure, and modify countermeasure equipment - RFAS | 0.34 (0.67) |
| Provide asset management support - RFAS | 0.58 (0.33) |
| Provide Program Management and Contract Support - RFAS | 0.1 (0.13) |

Office of Director

| Employee | In/Out |
|---|---|
| SMITH, Caden ($125,156) | ⏻ |

| Function | Total FTE (loss) |
|---|---|
| Complete Strategic Planning and Force Development | 0 (0.05) |
| Evaluate the impact of new technology on existing systems and emerging outages - Front Office | 0 (0.02) |
| Oversee and Coordinate Ongoing Work, Including Special Projects | 0.15 (0.57) |
| Manage Budget/Procurement Activities | 0.64 (0.18) |
| Manage Administrative Areas | 0.73 (0.04) |
| Manage contracts and performance of employees | 0.29 (0.07) |
| Complete Budget Activities/Tasks Delegated by the Office of Financial Management | 0.58 (0.07) |

FIG. 7(g) page D

FIG. 7(j) page A *Predictive Modeling : Model*

ROOT
/ TOP OF THE ORG

Office of Director

*Target Adjustment : 15%*

| Case | Achieved Adjustment | Headcount | Critical Functionality Support Lose Score | Institutional Knowledge Lose Score |
|---|---|---|---|---|
| Case 1 ● | -15.1($4,876,195) | -8 | 76 | 12 |
| Case 2 ○ | -15.3($4,643,197) | -8 | 64 | 41 |
| Case 3 ○ | -14.7($4,986,949) | -7 | 81 | 33 |
| Case 4 ○ | -15.6($4,801,195) | -8 | 25 | 25 |
| Case 5 ○ | -15.2($4,864,195) | -8 | 47 | 08 |

Show Impact Summary    START NEW

| Functions | Reported | Targeted | Achieved |
|---|---|---|---|
| | $450,275 | $450,275 ($0) | $450,275 ($0) |
| Complete Strategic Planning and Force Development ($6,258) — 781 | | | |
| SMITH, Caden | 0.05 | | 0.05 (0.0%) |
| Evaluate the impact of new technology on existing systems and emerging outages - Front Office ($2,503) — 781 | /783 | | |
| SMITH, Caden — 782 | 0.02 | | 0.02 (0.0%) |
| Oversee and Coordinate Ongoing Work, Including Special Projects ($87,695) | | | |
| THOMAS, Lily | 0.15 — 783 | | 0.15 (0.0%) |
| SMITH, Caden | 0.57 — 783 | | 0.57 (0.0%) |
| Manage Budget/Procurement Activities ($93,096) | | | |
| THOMAS, Lily — 782 | 0.24 | | 0.24 (0.0%) |
| SMITH, Caden — 782 | 0.18 | | 0.18 (0.0%) |
| DAVIS, Zoe | 0.4 — 783 | | 0.4 (0.0%) |
| Manage Administrative Areas ($82,627) | | | |
| THOMAS, Lily | 0.23 | | 0.23 (0.0%) |
| SMITH, Caden | 0.04 | | 0.04 (0.0%) |
| THOMPSON, Lily | 0.5 | | 0.5 (0.0%) |

FIG. 7(j) page B

FIG. 7(j) page C

| Manage contracts and performance of employees ($40,774) | | |
|---|---|---|
| THOMAS, Lily | 0.09 | 0.09 (0.0%) |
| SMITH, Caden | 0.07 | 0.07 (0.0%) |
| DAVIS, Zoe | 0.2 | 0.2 (0.0%) |
| Complete Budget Activities/Tasks Delegated by the Office of Financial Management ($71,604) | | |
| THOMAS, Lily | 0.18 | 0.18 (0.0%) |
| SMITH, Caden | 0.07 | 0.07 (0.0%) |
| DAVIS, Zoe | 0.2 | 0.2 (0.0%) |
| THOMPSON, Lily | 0.2 | 0.2 (0.0%) |
| Complete Procurement Activities/Tasks Delegated by the Office of Financial Management ($65,718) | | |
| THOMAS, Lily | 0.11 | 0.11 (0.0%) |
| DAVIS, Zoe | 0.2 | 0.2 (0.0%) |
| THOMPSON, Lily | 0.3 | 0.3 (0.0%) |
| Complete Accounting Activities/Tasks Delegated by the Office of Financial Management ($0) | | |

| Employee | | FTE | In/Out |
|---|---|---|---|
| DAVIS, Zoe ($110,995) | | 1.00 | ⟳ |
| MILLER, Jackson ($168,016) | 785 | 0.00 | ⟳ |
| SMITH, Caden ($125,156) | | 1.00 | ⟳ |
| THOMAS, Lily ($109,042) | | 1.00 | ⟳ |
| THOMPSON, Lily ($105,082) | | 1.00 | ⟳ |

FIG. 7(j) page D

*Predictive Modeling : Model*

ROOT
/ TOP OF THE ORG

Construction Division

*Target Adjustment : 15%   Achieved Adjustment : -35.8%*
*Adjustment Count: 8*

[Show Impact Summary]  [START NEW]

| | Reported | Targeted | Achieved |
|---|---|---|---|
| | $343,088 | $220,311 ($-122,777) | $220,311 ($0) |
| Functions | | | |
| Develop and monitor plans to maintain utilities during all construction activities   ($113,910) | | | |
| RODRIGUEZ, Ethan — 782 | 0.35 — 783 | | 0.35  (0.0%) |
| RODRIGUEZ, Liam — 782 | 0.75 — 783 | | 0.0  (-100.0%) |
| ANDERSON, Zoe — 782 | 0.7 | | 0.7  (0.0%) |
| Conduct roving monitoring of assigned facility   ($17,275) — 781 | | | |
| RODRIGUEZ, Ethan | 0.15 | | 0.35  (0.0%) |
| ANDERSON, Lucas | 4.5499997 | | 4.5499997  (0.0%) |
| Conduct access to assigned facility   ($5,758) — 781 | | | |
| RODRIGUEZ, Ethan | 0.05 | | 0.05  (0.0%) |
| ANDERSON, Lucas | 5.72 | | 5.72  (0.0%) |
| Provide support functions as needed   ($28,791) | | | |
| RODRIGUEZ, Ethan | 0.25 | | 0.25  (0.0%) |

FIG. 7(k) page A

| Provide program and project management contractor support  ($17,275) | | | |
|---|---|---|---|
| RODRIGUEZ, Ethan | 0.15 | | 0.15  (0.0%) |
| ANDERSON, Lucas | 2.73 | | 2.73  (0.0%) |
| Coordinate all operational utilities efforts with relevant stakeholders for all ongoing construction  ($37,302) | | | |
| RODRIGUEZ, Ethan | 0.05 | | 0.05  (0.0%) |
| RODRIGUEZ, Liam | 0.25 | | 0.0  (-100.0%) |
| ANDERSON, Zoe | 0.3 | | 0.3  (0.0%) |

| Employee | FTE | In/Out |
|---|---|---|
| ANDERSON, Zoe ($105,147) | 1.00 | ⏻ |
| RODRIGUEZ, Ethan ($115,164) | 1.00 | ⏻ |
| RODRIGUEZ, Liam ($122,777) | 1.00 | ⏻ |

FIG. 7(k) page B

COMPUTERIZED WORKFORCE MANAGEMENT SYSTEM FOR IMPROVING AN ORGANIZATION'S CAPACITY TO FULFILL ITS MISSION

This application is a nonprovisional of U.S. Provisional App. Ser. No. 62/550,662, incorporated by reference.

BACKGROUND

This application relates to computer systems for operating a business.

SUMMARY

In general, in a first aspect, the invention features a method, and a computer programmed to perform the machine-implemented parts of the method. A computer builds a model of a group. The model includes missions of the group and tasks that the group performs to achieve its missions. The computer queries managers of the group to obtain the managers' requested levels for a plurality of resources for the group, including requested levels of proficiency for a plurality of competencies for performance of tasks of the group, and stores the managers' requested levels in the memory of the computer. The computer queries staff members of the group to obtain staff assessments of the degree to which the group meets the requested levels of the resources, including the degree to which staff have proficiency in the competencies, and stores the staff assessments in the memory of the computer. The computer compares the managers' requested levels and the staff assessments to identify mismatches between the requests and assessments. The computer reports the mismatches to the managers. The computer perturbs the model to reflect a change of a requirement imposed on the group. The computer receives from the managers a plurality of sets of adaptations in the model to reflect adaptations to the group that the managers may make to respond to the changed imposed requirement. The computer computes a value of a desirability function of the model under each of the plurality of sets of adaptations, and provides the computed desirability function values in a form that permits the managers to choose a desirable one of the sets of adaptations to the group for implementation by the group.

In general, in a second aspect, the invention features a method, and a computer programmed to perform the machine-implemented parts of the method. A computer queries managers of a group to obtain the managers' requested levels for a plurality of resources for the group, including requested levels of proficiency for a plurality of competencies for performance of tasks of the group, and stores the managers' requested levels in the memory of the computer. The computer queries staff members of the group to obtain staff assessments of the degree to which the group meets the requested levels of the resources, including the degree to which staff have proficiency in the competencies, and stores the staff assessments in the memory of the computer. The computer compares the managers' requested levels and the staff assessments to identify mismatches between the requests and assessments. The computer reports the mismatches to the managers.

In general, in a third aspect, the invention features a method, and a computer programmed to perform the machine-implemented parts of the method. A computer builds a model of a group, the model including missions of the group and tasks that the group performs to achieve its missions. The computer perturbs the model to reflect a change of a requirement imposed on the group. The computer receives from the managers a plurality of sets of adaptations in the model to reflect adaptations to the group that the managers may make to respond to the changed imposed requirement. The computer computes a value of a desirability function of the model under each of the plurality of sets of adaptations, and provides the computed desirability function values in a form that permits the managers to choose a desirable one of the sets of adaptations to the group for implementation by the group.

In general, in a fourth aspect, the invention features a method, and a computer programmed to perform the machine-implemented parts of the method. A computer queries managers of an organization to obtain a management view of a plurality of critical resource requirements for an organization, and stores that management view in the memory of a computer. A computer queries employees of an organization to obtain employee views of the degree to which the organization meets the critical resource requirements, and stores that employee view in the memory of a computer. A computer compares the management view and the employee view to identify mismatches between the two views. The reports the mismatches to management.

In general, in a fifth aspect, the invention features a method, and a computer programmed to perform the machine-implemented parts of the method. A computer queries managers of an organization to obtain a management view of required levels of proficiency for a plurality of competencies for performance of tasks of an organization, and stores that management view in the memory of a computer. A computer, queries employees of an organization to obtain employee views of the degree to which the employees have proficiency in the competencies. A computer compares the management view and the employee view to identify mismatches between the two views. A computer reports the mismatches to management.

In general, in a sixth aspect, the invention features a method, and a computer programmed to perform the machine-implemented parts of the method. A computer builds a model of an organization, including missions of the organization and tasks that the organization performs to achieve its missions. A computer perturbs the model to reflect a change of an external requirement imposed on the organization. A computer receives from management a plurality of sets of changes in the model to reflect changes to the organization that management may make to respond to the changed external requirement. A computer computes risk of failure of the mission under each of the plurality of changes, and reports computed risk for each respective change to management, in a form that permits management to choose from among the sets of changes the change that desirably minimizes computed risk of failure.

In general, in a seventh aspect, the invention features a method, and a computer programmed to perform the machine-implemented parts of the method. A memory of a digital computer stores a plurality of data structures describing suborganizations of an organization, a plurality of data structures describing respective tasks to be performed by the organization under management by the one or more managers, the task data structures describing managers' priority levels for the respective tasks, and data structures describing employees of the organization, the employee data structures including data describing employee proficiency of specific employees for specific tasks from among the organization's tasks. A processor of the digital computer computes an allocation of employee data structures to the suborganization data structures based on the stored task priority data and stored proficiency data, the allocation reflecting a computed optimization of allocations. The computation proceeds by creating a number of trial allocations, computing a value of an objective function for the trial allocations, and choosing from among the trial allocations with best objective function. The objective function modeling the organization's ability to perform its highest priority tasks and at least one of the group consisting of reduction of the organization's costs, in any reduction in force, recommendation of employees that are retirement-eligible, or employees that are near retirement, and/or assignment of employees that have high proficiencies in high priority tasks with specific tasks that are of high priority. The computer reports the computed optimization of allocation to the managers.

Specific embodiments may include one or more of the following features. The computer may compare managers' requested levels of proficiency with staff assessments of proficiency to identify gaps where manager requested levels substantially exceed staff assessments. The computer may weight levels in the gaps by criticality of the competency, and report the gaps to managers based on the weighted levels. The computer may recommend training for specific competencies of specific staff members based on the weighted gap levels. The computer may compute the value of the desirability function as a probability of failure of a responsibility of the group. The computer may compute the value of the desirability function as a probability of failure of a responsibility of the group, weighted by criticality of that responsibility. The computer may receive the perturbation of the model as user input through a user interface to the computer. The computer may receive at least some of the adaptations as user input through a user interface to the computer. The computer may compute at least some of the adaptations automatically by computer in an optimization algorithm. ("Optimization" is used in the sense used in the fields of operations research, industrial decision system, or similar fields—an "optimized" solution is a very good solution within some set of constraints, but not necessarily the single very best solution. In many areas of computation, searching for the single very best solution is computationally intractable, the mathematical models lack perfect information and thus can only offer imperfect approximations, and often solutions must have discrete integer values where the model would find fractional outcomes. So the word "optimize" as used in the art means "near optimal" or "approximately optimal.") The computer may compute an adaptation f the organizational structure based on alignment of activities or competencies of two suborganizations of the group.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 2(*b*) shows data structures used to store the data in an organization chart.

FIGS. 3(*b*) to 3(*g*) are screen shots showing data entry for a mission model.
FIGS. 4(*a*) to 4(*d*) are screen shots of surveys.
FIGS. 6 and 7(*a*) to 7(*k*) are computer screen shots.

DESCRIPTION

Figure 1:
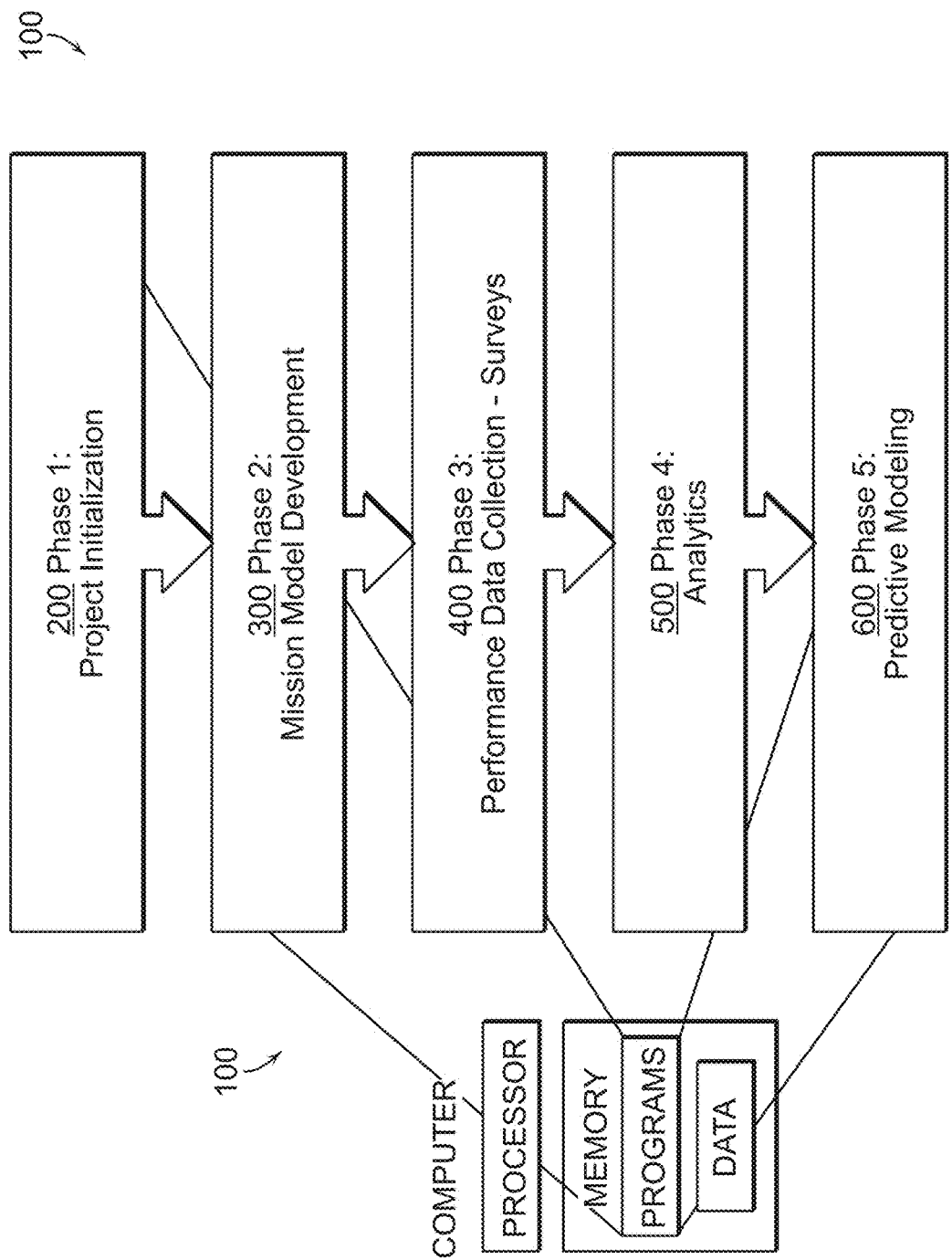
FIG. 1 is a flow chart.

The Description is organized as follows.
I. Overview
II. Phase 1: project initialization, defining the organization
III. Phase 2: building the mission model
   III (A) Four-level hierarchy: mission, function, activity, competency
   III (B) Criticalities
   III (C) Performance standards
   III (D) Proficiencies
   III (E) Performance and progress
   III (F) Building the mission model
IV. Phase 3: Surveys
   IV (A) Surveying employees to identify failure risks
   IV (B) Employee and contractor survey
   IV (C) Survey for customers and other stakeholders
   IV (D) Manager validation survey
V. Phase 4: Analyzing the models and surveys and presenting analytical information
   V(A) Cross-validation of surveys
   V(B) Workforce analysis
   V(C) Functional analysis
   V(D) Competency analysis
      V.D.1. Proficiency gap analysis to prevent short-term mission failure
      V.D.2. Competency analysis to enhance long term organizational fitness
   V(E) Organization and workforce development analysis
VI. Assessment of risk
VII. Phase 5: Predictive modeling of organizational changes
   VII (A) Computational modeling
   VII (B) Budget cut
      VII.B.1. Manual distribution of a budget cut
      VII.B.2. Automated modeling of a budget cut
      VII.B.3. Offering computed suggestions to the user
      VII.B.4. Manual further adjustment
      VII.B.5. Displaying modeling results to the user
   VII (C) Mission change
   VII (D) Organizational restructure
   VII (E) Trial copies of the organization chart and mission model
VIII. Report generator
IX. Computer implementation
I. Overview Referring to FIG. 1, a workforce management computer system 100 may perform an assessment for an organization by focusing on the performance of the organization's mission, to identify any mismatch between the skills and activities required for fulfillment of the mission vs. the skills and capabilities extant in the organization's employees, and using predictive modeling to advise on potential changes to the organizational structure to improve fulfillment of the organization's mission. The system may proceed through five phases.

In phase 1 200 (discussed in section II, FIGS. 2(*a*) to 2(*b*)) a user may set up a project, inputting characteristics of the organization.

In phase 2 300 (discussed in section III, FIGS. 3(*a*) to 3(*g*)), the system may gather information on the mission of the organization, the functions that implement the mission, the activities that implement the functions, and capabilities required for the activities. The system may query the organization's managers to assess the capabilities required for each step in fulfilling the mission as well as numerical estimates of time and progress, and subjective impressions of managers for progress and success of their organizations well as numerical estimates of time and progress, and subjective impressions of managers for progress and success specific mission, function, or activity.

In phase 3 400 (discussed in section IV, FIGS. 4(*a*) to 4(*d*)), the system may survey customers, and stakeholders. The system may survey employees for their self-assessment of time spent on different functions and activities for the past year as well as level proficiency in required competencies. The system may survey managers to validate employees' self-assessment In phase 4 500 (discussed in section V, FIGS. 5(*a*) to 5(*r*)), the system may analyze the data to identify points where employee capabilities might fall short of that required for mission success.

Figure 7C:
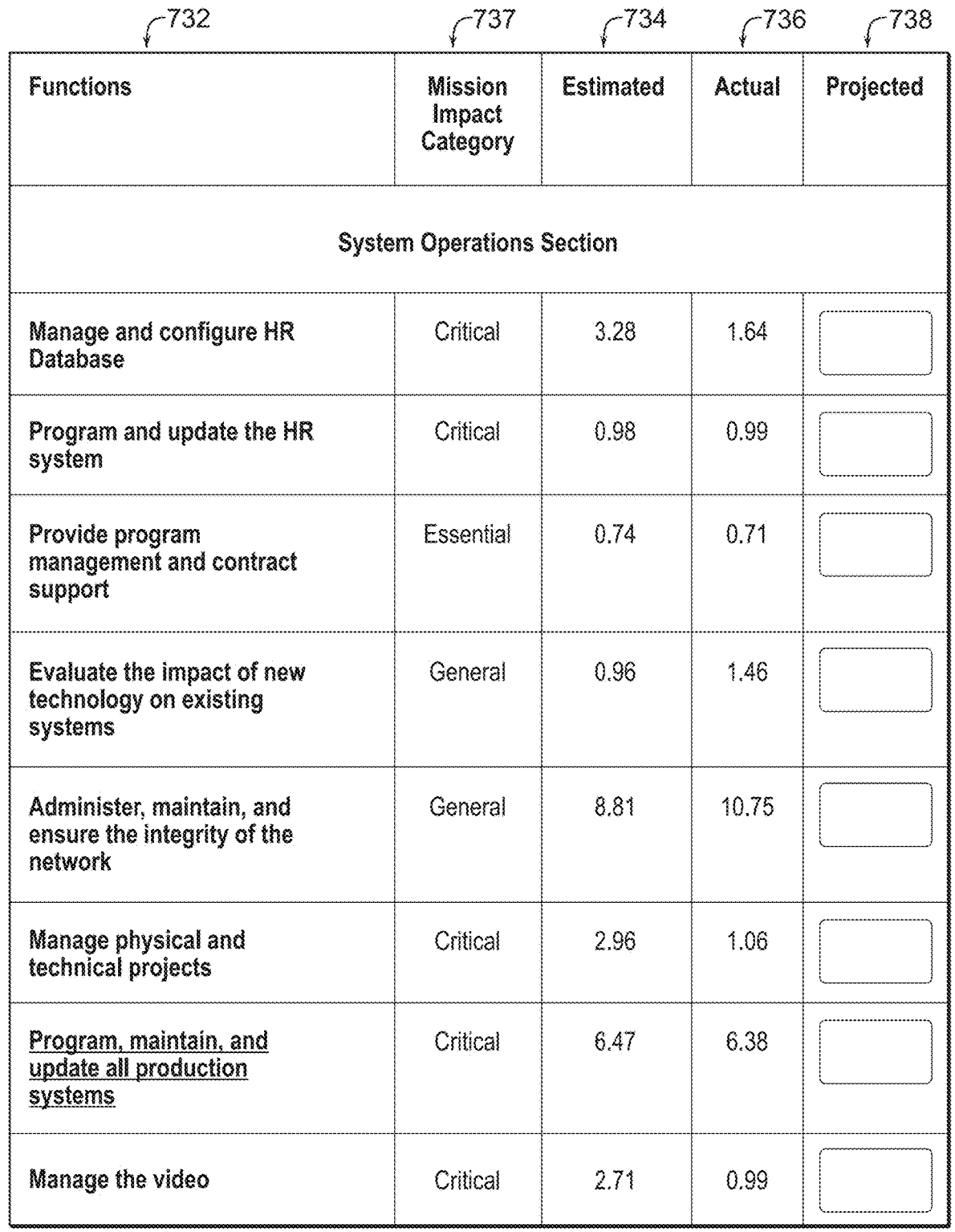
Figure 7H:
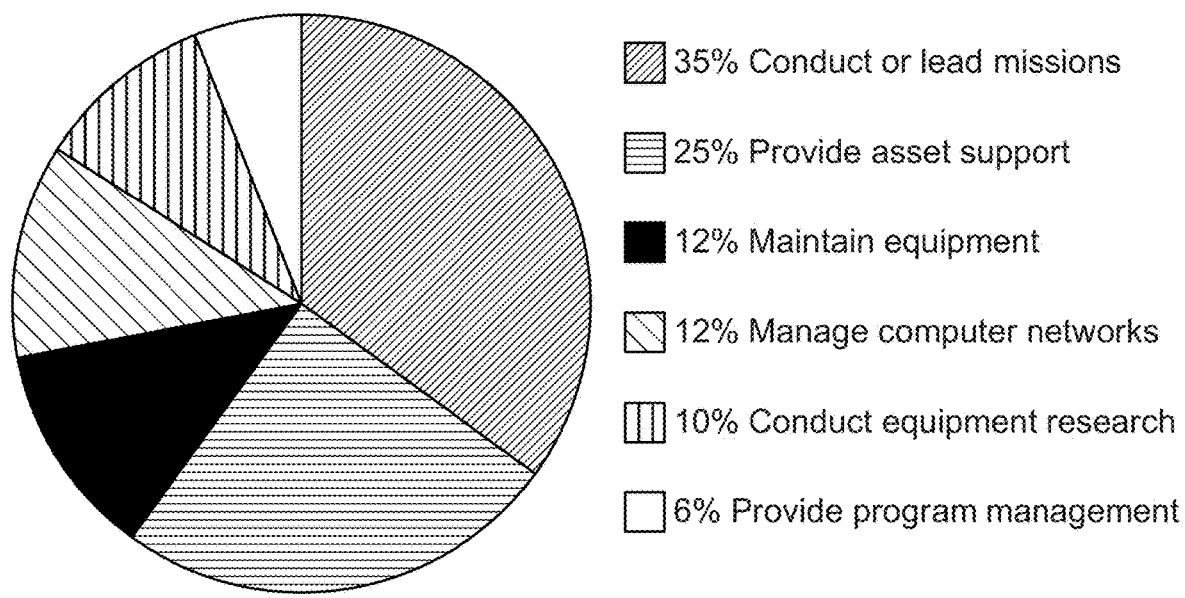
Figure 7I:
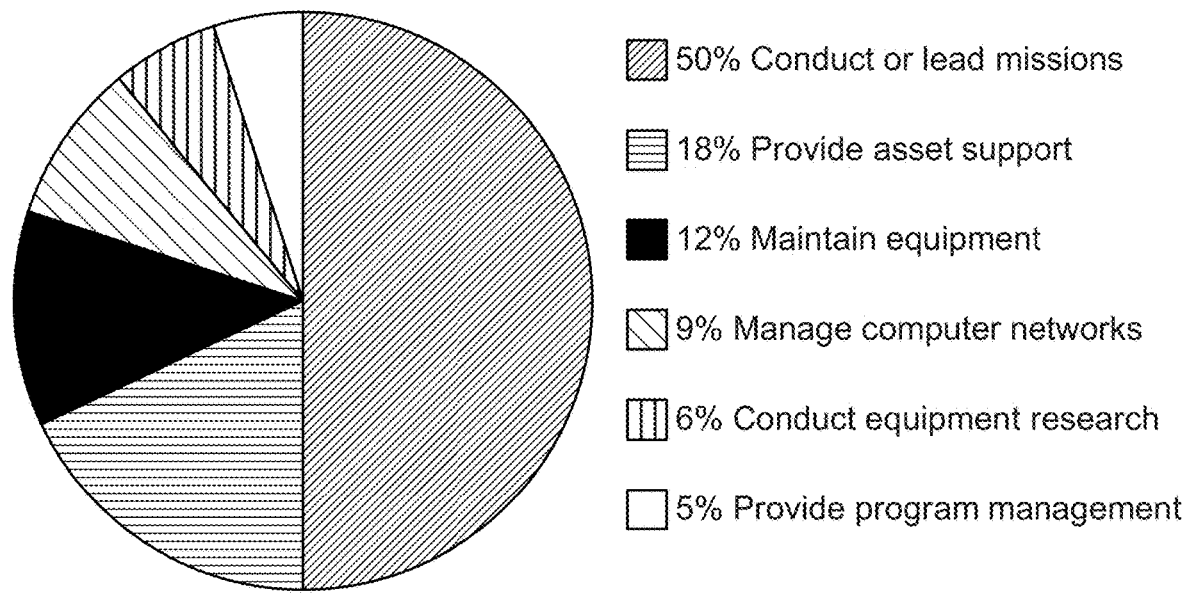

In phase 5 600 (discussed in sections VII, FIGS. 6 and 7(*a*) to 7(*k*)), the system allows predictive modeling, in which a manager can model external perturbations such as budget cuts, reduced or enlarged mission statements, and the like. The manager may then adjust staffing, resource allocation and the like, to ascertain proper management response to the perturbation. The system may use analysis of phase 4 for modeling changes in employee availability and capability to cover shortfalls in staffing and competencies.

The mission/function/activity/competency model (see section III) permits analysis of intra-organizational flows of outputs from one suborganization as inputs to other suborganizations. Each node in the mission model graph generally models outputs produced or results achieved. On the other hand, an "org chart" organizational structure (see section II) models human resources as the inputs to those processes. The modeling techniques of workforce management system 100 may improve the ability of a computer to design an organizational structure and/or to allocate employees among an organization to improve the organization's ability and efficiency in fulfilling its missions and functions.

II. Phase 1: Project Initialization, Defining the Organization

Referring to FIGS. 2(*a*) and 2(*b*), the workforce management system 100, in phase 1 200, may initiate a project by receiving input describing a number of components of the organization that is tasked with performing the project or mission to build an organizational model 202. The "org chart" 204 of an organization shows the organization of divisions 206, departments, sections 208, and the like, within the organization. Each organization and suborganization 206, 208 has employees 230 and contractors 240, a history of hiring and attrition 250, and budget (including finances, budget, payroll, salaries, time and attendance, capital expenditures) 260, customers 270 and other stakeholders 280, its name, etc. Each employee and contractor 230, 240 of the organization is identified by name, employee/contractor number, position, the suborganization 206, 208 in which the employee/contractor is primarily employed, the employee/contractor's hire date, retirement eligibility, and various parameters relating to compensation so that the system has an accurate view of the employee/contractor's cost for performing certain tasks. Each employee separation (attrition) event may have a record 250 that has a link to the relevant employee record 230, 240, the position last held by the employee, the section in which the employee worked, the hire date, and the separation date. Since each employee has a record in the database, each organization record may have a link to its manager's record.

The user may enter the organization and suborganization data into workforce management system 100 either by importing data from the organization's personnel system (for example, by importing a .xls or .csv file exported from the personnel system), or by hand-entering data through a user interface, or some combination of the two. Workforce management system 100 may provide a user interface for editing a newly-input or existing organizational model 202, to change names, linkages among suborganizations 206, 208, reallocate employees among the suborganization blocks, and the like. Workforce management system 100 may issue warnings for either missing, duplicate or incorrectly formatted data.

Workforce management system 100 may provide an ability to reorganize the organizational hierarchy, which may become especially helpful in predictive modeling as discussed in connection with FIGS. 6 and 7(*a*) to 7(*f*) in section VII.

III. Phase 2: Building the Mission Model

Referring to FIG. 3(*a*), mission model 310 is a centerpiece around which workforce management system 100 collects, organizes, and analyzes information about employees' activities and competencies, to predict whether the organization is making satisfactory progress toward fulfillment of its mission, and assist management in making changes to improve that fulfillment. In some implementations, mission model 310 may be a hierarchically-structured data structure, implemented as records in a relational database.

Phase 2 300 of workforce management system 100 may build mission model 310 through a user interface that gathers information from managers, for example through interviews or question-and-answer dialog. Mission model 310 captures knowledge and intuitions of managers about their organizations and how they work, to identify missions, functions that make up those missions, and activities that support those functions, and competencies that allow performance of those activities.

III (A) Four-Level Hierarchy: Mission, Function, Activity, Competency

Referring again to FIG. 3(*a*), in one example, missions of an organization may be modeled 310 in a four-level hierarchy:

The top level may be a "mission" 312—each organization and suborganization 206, 208 (see FIG. 2(*a*)) has one or more missions 312, typically no more than five. "Missions" tend to be imposed from outside the organization, and are essentially fixed from the point of view of the relevant manger.

Each mission has one or more "functions" 314, major categories of work that contribute to the fulfillment of the mission 312, typically between three and five. Functions are unique in an organization.

Each function may have one or more "activities" 316. Activities are lower-level categories of work within a function 314, that support achieving the function.

Each activity may have "competencies" 318, particular characteristics that support performance of the activity.

Managers have discretion to divide their missions 312 into functions 314 and activities 316 as a matter of management strategic and tactical discretion. Mission model 310 may help focus investigations into how an organization can fulfill its mission(s) within externally-imposed constraints.

Each organization is created to perform a certain mission 312. Usually a single organization or suborganization 206, 208 (from FIGS. 2(a) and 2(b)) has several suborganizations 206, 208, and several missions 312. In some cases, an organization's missions 312 are mapped to its individual suborganizations 206, 208, but not always, so the data structures and database schema permit any connection between missions and suborganizations 206, 208.

A "function" is a high-enough level of a field of work to ensure that all work within a suborganization 206, 208 is embraced within a "mission" and a "function."

Each function 314 in mission model 310 may have a set of activities 316. The difference between a "function" 314 and an "activity" 316 is that a function 314 is unique in an organization, but activities 316 are not unique. A function 314 tends to be characterized by its result achieved, where an activity tends to be defined by the time, cost, or effort expended 316. Activities 316 are relatively fungible tasks, that may be replicated across an organization, and people may move into and out of specific activities 316. The database schema may be designed so that multiple functions 314 can use the same activity 316—often, in order to perform a function 314, an organization requires a set of activities 316, but the result of a given activity 314 may well be useful in multiple functions 316. The same activity 316 might be performed in different functions 314, and knowing this might allow management of the organization to combine functions 314, or to improve efficiency by putting functions 314 with similar activities 316 into the same organization 206, 208.

Similar activities 316 can apply to different functions 314 in mission model 310. Typically, an employee performing an activity 316 that applies to multiple functions 314 will estimate both the total amount of time he/she spends on the activity 316, and also allocate his/her time between the amount of that activity 314 time spent on each of the applicable functions 316. Alternatively, the allocation of employee time among activities 314 may be selected by a manager. In either case, the allocation of time is input into workforce management system 100 though the user interface.

Each activity 316 calls for specific competencies 318, and competencies 318 are linked to activities 316 annotated with a criticality and performance standard. Competencies 318 may be fundamentals like "Attention to detail," "Collaboration," "Computer skills," and the like, technical skills specific to the job such as "Knowledge of x" (where x is some skill specific to the individual job), etc.

To consider one example: a function 314 of "developing computer program x" may have activities 316 user-level specification, specification review, design specification, design review, coding, unit testing, peer review, and integration testing. These activities 316 may require different level of proficiency in the following competencies 318: analysis, Java programming, specific testing framework, and testing strategies.

Figure 2A:
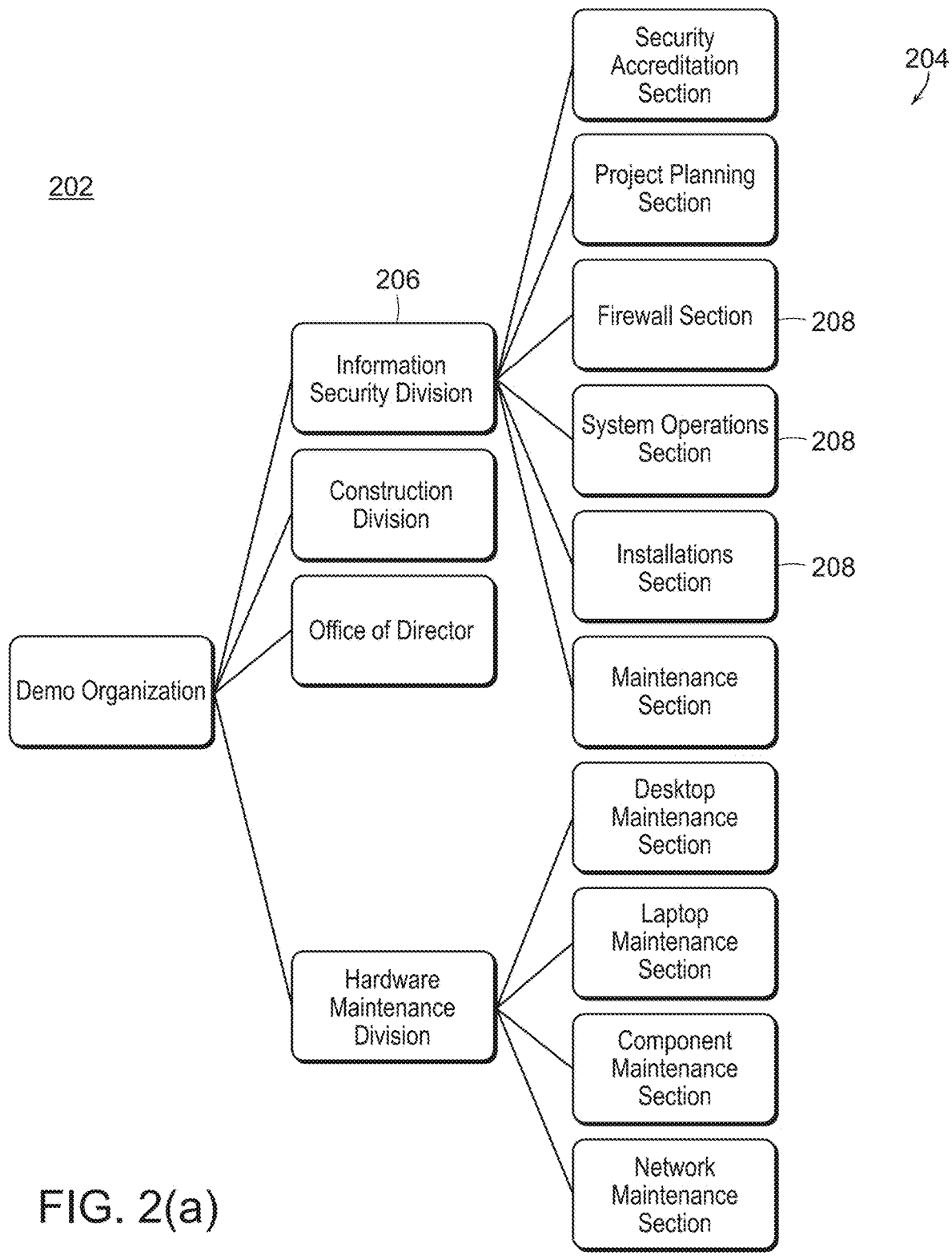
FIG. 2(*a*) is an organization chart.
Figure 2B:
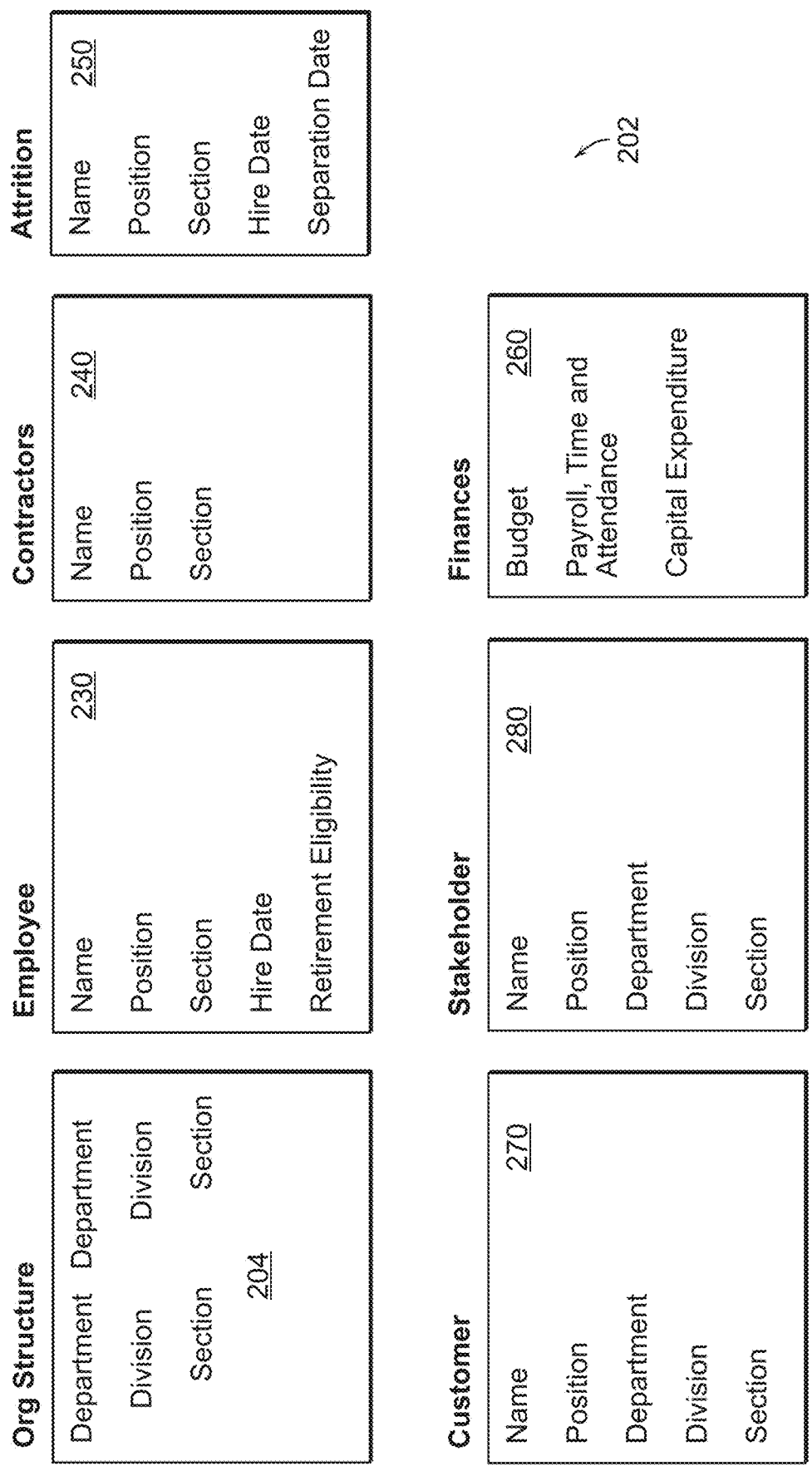
Figure 3A:
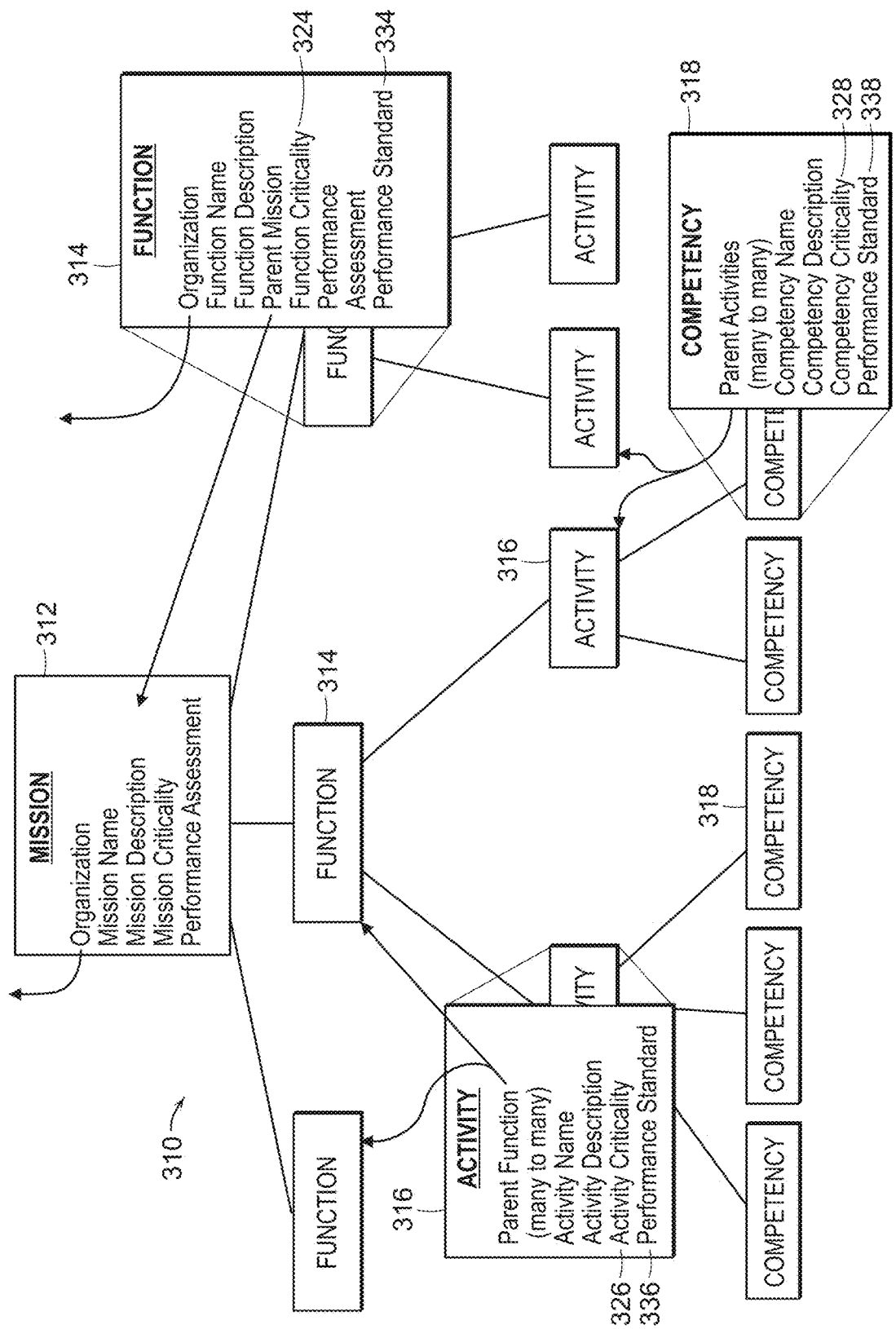
FIG. 3(*a*) shows data structures implementing a mission model for an organization.

Note that the organizational hierarchy of FIGS. 2(a) and 2(b) is different than mission model 310 hierarchy of FIG. 3(a). In the general case, each organization and suborganization 206, 208 of FIG. 2(a) may have a mission-function-activity-competency model 310 of FIG. 3(a) as one of its annotations. They may link together as appropriate—for example:

A mission 312 (FIG. 3(a)) of a higher-level suborganization 206, 208 (FIG. 2(a)) may flow down to a lower-level suborganization 206, 208, and thus the mission 312 record in the database may be multiply linked to the two suborganizations 206, 208.

A mission 312 of a lower-level suborganization 206, 208 may be a function 314 for a mission of a higher-level suborganization.

In some implementations, the data structure or database record structure used for function entities 314 and mission entities 312 may be the same. In such implementations, a "function" entity with no parent is a "mission" 312 simply by the fact of having no parent.

In one example, functions 314 are unique in that each function may only appear once in mission model 310, but other links in the database may reflect delegation of responsibility for actually fulfilling a function 314 to another suborganization 206, 208 within the organization.

In some cases, a function 314 may have multiple subfunctions 314.

III (B) Criticalities

Each mission 312 consists of several functions 314, and among these functions 314, some are critical to the mission 312 (thus, each critical function 314 can be a single-point failure for the entire mission 312), and some are less critical. In turn, activities 316 of a function 314 may vary in criticality, and likewise competencies of an activity 316. Criticality may be categorized, for example, as follows:

Critical: contributes directly to the success of the function/mission (typically, only a small number of activities will be categorized as "critical"), and failure of a critical function 314 will nearly by definition cause failure of the mission 312.

Essential: represents an essential part of function/mission fulfillment (typically, one among several other such activities)

General: generally or logistically contributes to fulfillment of the function/mission For this reason, each function record in the database may have a criticality field 324, and managers may be queried to characterize that criticality. Similarly, the activities within a function also have varying criticalities 326, so an activity record in a database has a criticality 326, and workforce management system 100 may query managers to characterize this criticality. Similarly, the competencies of an activity may be higher or lower criticality 328.

Alternatively, because activities 316 may be reused for different functions 314, and competencies 318 may be reused for multiple activities 316, an activity or competency may be high criticality 324 for one function or activity, and lower criticality for another. In some cases, the mission model data structures may be arranged to annotate criticality for an activity or competency in a record that represents an edge in mission model graph 310, for the edge record joining the activity to its respective function(s) or activitie(s), rather than in the record for the activity itself.

III (C) Performance Standards

Mission model 310 also captures performance standards 334, 336, 338 for functions, activities, and competencies. A performance standard is a number, a manager's estimate of the effort necessary to fulfill a function or activity completely. A performance standard may be measured as a number of hours, number of people, cost, FTE person, or other measure, perhaps necessary for performance of an ongoing project, or for completion of a one-time project. The units of the performance standard may be selected as appropriate, for example, a total number of hours for the life of a project, or a number of hours per month for an ongoing duty. The performance standard may be entered into mission model 310 via a user interface, when workforce management system 100 queries the manager to find out what the manager believes is required for function/activity fulfillment.

Similarly to criticalities 324, 326, 328, typically a performance standard 334, 336, 338 is not constant for any one node in the tree, but rather, the performance standard 336 for (for example) an activity may differ for multiple functions. For that reason, performance standards may be stored in database records corresponding to edges in mission model 310 graph connecting the activity to its functions.

III (D) Proficiencies

Each competency 318 may have two properties: a criticality 328 (typically on the same critical-essential-general criticality scale set for functions and activities, see section III (B)), and a minimum acceptable proficiency level assigned by management. The proficiency levels may be assigned as one of several levels, for example:

Fundamental Awareness: a common knowledge or an understanding of basic techniques and concepts.

Novice: the level of experience gained in a classroom and/or experimental scenarios or as a trainee on-the-job. Employees are expected to need help when performing this skill.

Intermediate: the ability to successfully complete tasks in this competency as requested. Help from an expert may be required from time to time, but employees should usually be able to perform the skill independently.

Advanced: the ability to perform the actions associated with this competency without assistance. Employees are recognized within the immediate organization as the "people to ask" when difficult questions arise regarding this competency.

Expert: the ability to provide guidance, troubleshoot and answer questions related to this competency. Employees should be known as an expert in this area.

This minimum proficiency level on the competency 318 is set by management. During the employee survey of Phase 3 400 (see section IV (B)), each employee will self-assess proficiency. Then in the analysis of Phase 4 (see section IV (D)), the system will compare managers' desired level of proficiency with employees' self-assessment of proficiency to identify at-risk activities.

III (E) Performance and Progress

Workforce management system 100 may ask managers to assess performance of each task 312, 314, 316 in mission model 310 (mission, function, or activity), for example, on a scale of excellent, satisfactory, or needs improvement.

III (F) Building the Mission Model

Referring to FIG. 3(*b*), this top-level screen shows the process of constructing a mission model. The mission 312 has been defined (at the top level). The first column 342 shows functions that have been created under the mission:

Maintain utilities of the office complex during all construction activities

Install, repair, and maintain the physical utilities, systems used to safeguard the office complex etc.

The third column 344 shows which suborganization 206, 208 or branch is primarily responsible for this function. The fourth column 346 shows the criticality 324 for each function to the mission. The fifth column 348 shows management's evaluation of "performance" of this function (see section III (E)). The sixth column gives a quantity, how often this function is performed.

FIG. 3(*c*) shows development of mission model 310 at the level of a division (the second level of the org chart hierarchy of FIG. 1(*a*)). Column one 350 show a list of missions. Note that the mission is repeated for the first six rows of the table. The second column 352 is labeled "Function," so the first six rows are functions 314 of the same mission 312 of the division. Column four 354 shows the suborganization 206, 208 or branch responsible for the respective function. Column five 356 shows the criticality 324 of the function to the mission. Column six 358 shows management's self-assessment of how well the function is currently performed. In some cases, in column seven, management may specify a quantity, how often the suborganization has performed this function. Column eight is a button that allows a user to edit the function.

The last two rows of FIG. 3(*c*) have a different mission, so those last two rows show functions of a second mission.

Other screens may allow adding new functions or editing existing functions. Workforce management system 100 may enable editing only for certain individuals, for example, a manager over the organization or suborganization 206, 208 to which the function belongs.

During initial building of the mission model, managers estimate how much time employees spend on each activity 316—activities may be the basic unit of accounting for employee cost in mission model 310.

FIG. 3(*d*) shows all activities 316 performed by a suborganization 206, 208 (without the hierarchy of connecting them to functions). This list display form permits ready editing, for example, to correct misspellings in activity name or activity description, so that the correction will take effect globally across all functions 314 for which this activity is performed. This edit also permits managers to review the list of all activities 316 already defined in mission model 310.

FIG. 3(*e*) shows two functions (note in column one 360, there are two discrete but repeated function names), with their activities 362. (FIGS. 3(*c*) and 3(*e*) can be viewed as a display of the mission-function-activity hierarchy, with the root of the hierarchy to the left.) A function may have several activities (columns 362 and 364). Column 366 shows criticality 326 of the activity to completion of the function. Column 368 shows time, the total amount of time that management believes needs to be spent on the activity in order for it to be performed correctly. Time estimates may be measured in any units convenient for the person doing the entry (hours since project inception, average minutes per day, average minutes per pay period, percentage of time, etc.) and the system may be designed to permit observers to display time estimates in other units.

Workforce management system 100 may also provide screens for editing activities, linking activities to existing functions, editing functions to add activities, changing names or parameters, etc.

FIG. 3(*f*) shows a list of all competencies 318 in the organization. Competencies may be grouped in four groups: fundamental competencies, leadership management competencies, administrative competencies, and technical competencies. Because all the competencies listed in this particular display page are "fundamental competencies," column 370 shows all competencies in this group. Column 372 is a button to edit the competency.

FIG. 3(*g*) shows three activities 316 (column 374) with their underlying competencies 318, 376, and the proficiency level (from section III (D)) that management believes to be required. Column 378 shows that these competencies are either "technical competencies" or "fundamental competencies" from among the five categories of competencies.

At this point, workforce management system 100 has completed building the organization model 202 and mission model 310. This information will now be used to interview or survey employees about their tasks, how those tasks relate to the organization's mission.

IV. Phase 3: Surveys

Referring to FIGS. 4(a) to 4(c), after the organizational structure (FIGS. 2(a) to 2(b), section II) and mission model (FIGS. 3(a) to 3(g), section III) are both created, workforce management system 100 may survey employees, contractors, customers, and other stakeholders to evaluate self-performance of and satisfaction with the organization, and to test whether goals and progress toward those goals are perceived internally as realistic and consistent. Then, in a second phase of surveying (discussed in connection with FIG. 4(d) in section IV (D)), managers may cross-check and validate those survey answers.

IV (A) Surveying Employees to Identify Failure Risks

Workforce management system 100 may be designed to offer organizational performance assessment, rather than individual performance assessments. Employees have difficulty providing information into personal performance assessment tools, but are usually very open in providing information about their own tasks, skills, and career goals, in the context of an organizational assessment. For this reason, many of the questions may be designed to communicate to survey respondents that the goal is to optimize organizational structure. In order to optimize structure, it's important that workforce management system 100 be able to gather information about business processes. At the same time, Workforce management system 100 may be designed to ask questions and offer suggestions, rather than dictate results. The human managers will always understand their organizations better than a computer tool can, and thus the survey questions and recommendations are designed to assist managers in considering alternatives, rather than to make opaque and final recommendations.

Workforce management system 100 may generate a user ID and password for each employee, contractor, manager, and other survey participant, and may send email invitations so participate in surveys. Workforce management system 100 may monitor how people participate in the survey and send reminders to ensure response.

IV (B) Employee and Contractor Survey

Workforce management system 100 may survey employees and contractors, to for their self-assessments vis-à-vis the mission model, for agreement with priorities in the mission model, for assessments of employees' and contractors' activities and competencies, accuracy of schedule estimates and time assignments, and the like.

The primary goal of the employee survey is to evaluate employees' workload and competence/skill proficiency levels vis-à-vis management's requests in the mission model, and to find out what employees are spending time on, for comparison against what managers expect. The entries of the mission model, especially the activity and competency levels, may be used as bases for employees' and contractors' self-assessment. Employees and contractors may be asked to estimate time they spend on activities in the mission model, and evaluate proficiency level on competencies from the mission model. In addition, workforce management system 100 may collect information on the working environment within the organization. The employee survey may ask questions to evaluate time spent on various activities.

Workforce management system 100 may ask each employee or contractor a variety of demographic information, such as age, highest level of education, certifications, time in current position, and how long he or she plans to remain with the company. The demographic part of the survey may include multiple choice questions, open-ended text questions to gather employee demographic data, and employee career development goals.

Referring to FIG. 4(a), workforce management system 100 may survey each employee or contractor about each activity he or she participates in, and ask him or her to evaluate the amount of time he or she spends on the activity and to evaluate the employee's perception of importance of that activity to the organization's mission.

In FIG. 4(a), workforce management system 100 is surveying an employee of the "Security Accreditation Section" about activities that he or she performs. The activities are grouped with their functions—thus, for function "Liase with Representatives on Changes in the Physical Utilities Field," three activities 316 are listed for the survey, and for function "Provide Special Event utilities," eight activities are surveyed. The screen of FIG. 4(a) requests the employee to enter the amount of time that he/she spends on each activity. Time may be entered in any set of units—percentage of time, hours over the year, hours over the last few months, average hours per week. The units for this answer may be selected by a manager so that all employees respond in the same units, or the system may allow each employee to select the most convenient units, and then convert all employees' responses to common units. Importance may be selected from a drop-down list to track the "criticality" categories from section III (B).

Questions may be built in, and workforce management system 100 may permit a survey designer to create questions specialized to this specific organization. Questions may be multiple choice or open-ended text, and may request objective information, or subjective assessments, for example:

In what areas (competencies and skills) does your organization need more qualified resources to meet mission requirements?

What three competencies are most critical to successful completion of the organization's mission?

Which activities of the organization suffer the most in quality or timeliness due to a lack of adequate staff or resources?

To support your career growth and professional development goals, in what three areas would you most benefit from training or support?

Do you agree with the following statement:
  I understand the mission of my organization or suborganization.
  I understand what is expected of me at work.
  I am able to meet expectations at work.
  I am equipped with the resources and tools needed to perform my work.
  I receive feedback on my performance.
  From your perspective, what works well within your organization or suborganization?
  What could work better in your organization or suborganization?

Referring to FIG. 4(c), the workforce management system may allow managers to create multiple-choice and open-ended questions to be included in the survey of employees and contractors. Those questions may be asked as part of the employee survey. Workforce management system 100 may protect employee answers by keeping individual answers masked from management, and providing only summaries.

Some questions may be asked of employees and contractors that will not be validated by managers (see section IV (D)). Answers to these questions may be used to predict the organization's development and sustainability with respect to performing its mission. Examples of these questions may include:

How long do you plan to work in this organization?

Do you have communicate with your manager?

Do you understand your mission?

Workforce management system 100 may summarize these answers, for example by reducing them to a statistical aggregate. Sub-statistics may be computed for critical functions or activities. That summary or statistical aggregate may be helpful to predict the direction of an organization—attrition risks and similar failures. This information may also help in succession planning, and in forming training and hiring plans.

Workforce management system 100 may ask each employee whether the data stored is (in the opinion of the employee) accurate, and may request correction of any inaccuracy. Corrections to the employee's own data may be reflected back to the HR system. Workforce management system 100 may track other corrections for review in the validation subphase (see section V(A)).

Referring to FIG. 4(d), workforce management system 100 may ask employees to assess the criticality of each activity and to self-assess proficiency in each competency that underlies at least one activity to which that employee is assigned. Since competencies may be common among multiple activities and functions, workforce management system 100 may be configured to ask about each competency only once. In other cases, where a competency may be nominally the same but apply differently in two different activities, workforce management system 100 may be configured to ask about these shared competencies separately.

Recall that management had assessed criticality during Phase 2 300, building mission model 310. This manager-assigned criticality is not shown to the employee in the survey. Rather, the survey seeks to obtain the employee's independent assessment of criticality. This allows workforce management system 100 to assess whether management and workforce have aligned or misaligned expectations.

Workforce management system 100 may track the status of employee/contractor response to the survey. A page visible to managers may list status of responses, showing who has not begun the survey, who has partially completed it, who has completed the survey, and whose completed surveys have been verified by managers, and showing the date of last action. Workforce management system 100 may provide the ability to send reminder emails to those employees or contractors that have not completed the survey.

After the survey deadline date closes, workforce management system 100 may lock the employee data so it can't be further altered, and sends a thank-you note to all employees.

IV (C) Survey for Customers and Other Stakeholders

Workforce management system 100 may survey customers and other stakeholders. Customers and stakeholder surveys may be designed to cross-check subjective data collected from managers into the mission model, to allow customers to validate assumptions by managers. For example, this survey may ask whether customers agree with managers' views of which missions and functions are critical and which are lower importance. The customer survey may ask for customer satisfaction with performance of missions and functions, and the like, to validate managers' assessments.

Customer surveys may assist management in understanding of satisfaction. Surveys may be tailored for and/or directed to customers of different parts of the organization. Other surveys may be relatively generic, not linked to a specific organization or a specific mission model.

IV (D) Manager Validation Survey

Optionally, managers may take the same survey as employees and contractors (section IV (B)).

Referring to FIG. 4(d), because the self-assessment of the employee/contractor survey (section IV (B)) is highly subjective, workforce management system 100 may use a manager survey to validate and improve data quality for the employee survey. This may be less a survey, and more a chance for managers to validate employee self-assessments.

Workforce management system 100 may issue a user ID and password to each manager. Each manager may see the survey results for employees in the manager's organization.

The manager may validate or verify employee responses, by providing the manager's view of amounts of time employee spent on specific activity, proficiency levels for specific competencies. Managers can change proficiency levels, but not change employee's selection of activities and competencies, for example, to add new competency to an activity. The validation survey may be designed to prevent managers from changing employee assignments during the survey phase.

Workforce management system 100 may restrict managers' ability to change some employee data. For example, an employee knows better than the manager how much time the employee spends on given tasks, so the manager is not permitted to change that evaluation. Likewise, Workforce management system 100 may restrict managers' ability to manipulate survey for political advantage—for example, a manager should not be able to add that an employee is doing certain activities, or add new functions to the manager's own scope of responsibility.

Workforce management system 100 saves both sets of data; the managers' responses do not overwrite employees' self-assessment.

V. Phase 4: Analyzing the Models and Surveys and Presenting Analytical Information In phase 4 500, from the organization model, mission model, and survey information, workforce management system 100 may compute and display various analyses of the information collected in earlier phases. Analysis may focus on three major areas: workforce analysis, functional analysis, and competency analysis.

V(A) Cross-Validation of Surveys

Workforce management system 100 may evaluate managers' and employees' survey responses against current levels and against each other for validation, especially the time allocation and proficiency questions; multiple choice and open-ended text answers may be validated and compared using artificial intelligence and natural language processing techniques. Workforce management system 100 may identify large differences between the employees' self-assessment and the managers'. Large differences may be flagged. For example:

If the manager's assessment of required resources is much larger than the current levels, workforce management system 100 may request evidence supporting the manager's budget increase, such as incident reports, queues of uncompleted tasks, and customer satisfaction surveys.

Large differences isolated to one or a few employees may indicate either that the employee and manager have misaligned perceptions or expectations.

A large number of differences between the manager and many employees but involving only one or two managers may indicate that the manager has unrealistic expectations of his/her organization.

Customers' and stakeholders' satisfaction survey (from section IV (C)) may be used to independently confirm the "excellent, satisfactory, needs improvement" progress assessments that managers provided (section III (E)) as well as validate (with the customers' point of view) managers' assessments of criticality of functions, activities, and competencies.

V(B) Workforce Analysis

Workforce demographic analysis may assess an organization's health and its contribution to mission fulfillment risk. Key metrics include employee-contractor composition and ratios and influences with management organization development strategy, attrition trend analysis, retirement eligibility and its likely effect on mission fulfillment, and alignment of employees' goals with the organization's mission.

Figure 5A:
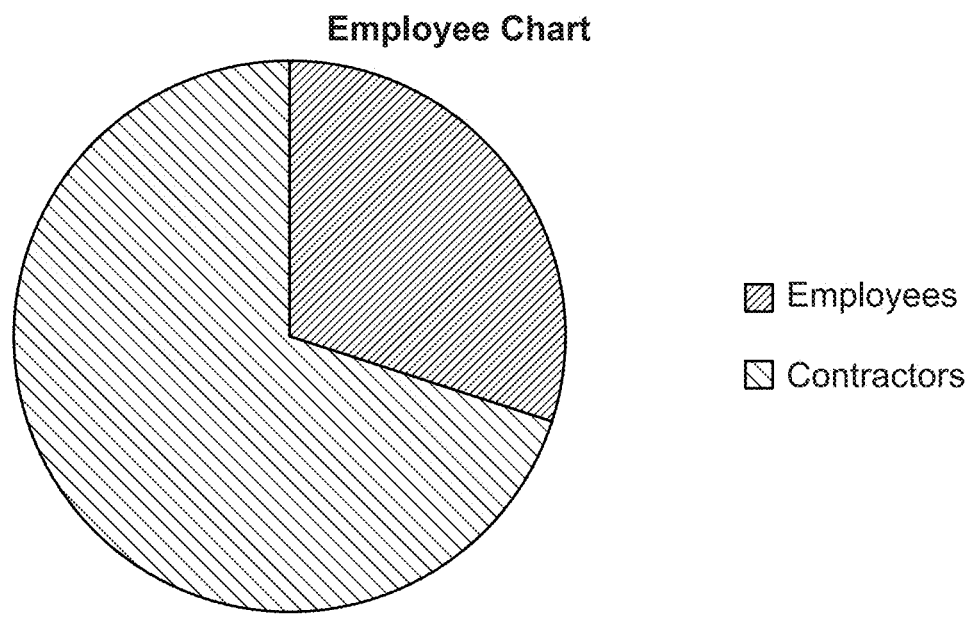
FIGS. 5(*a*) to 5(*r*) are output charts from a computer.
Figure 5B:
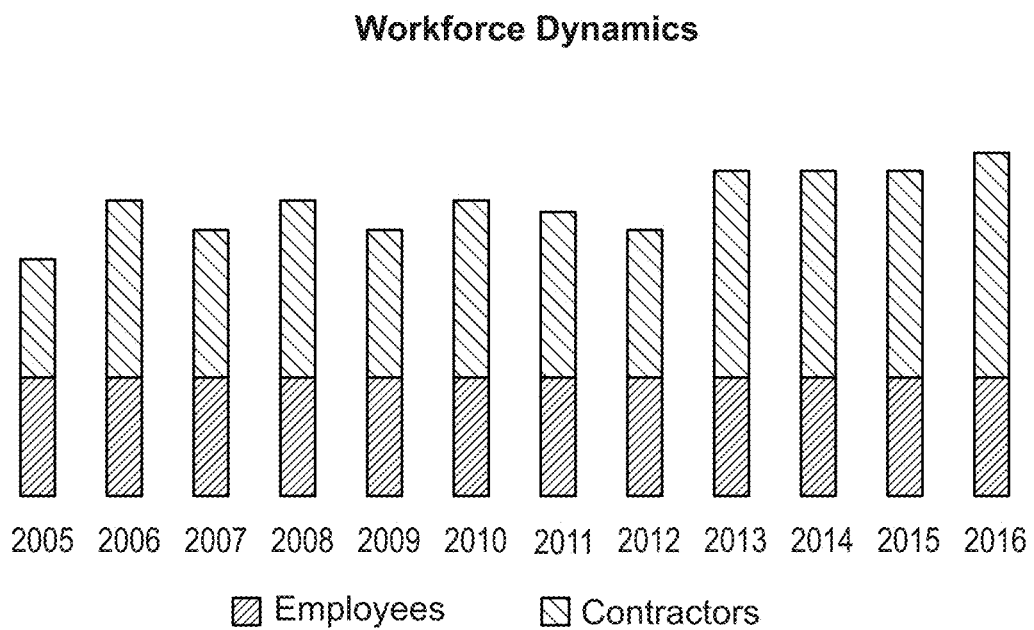
Figure 5C:
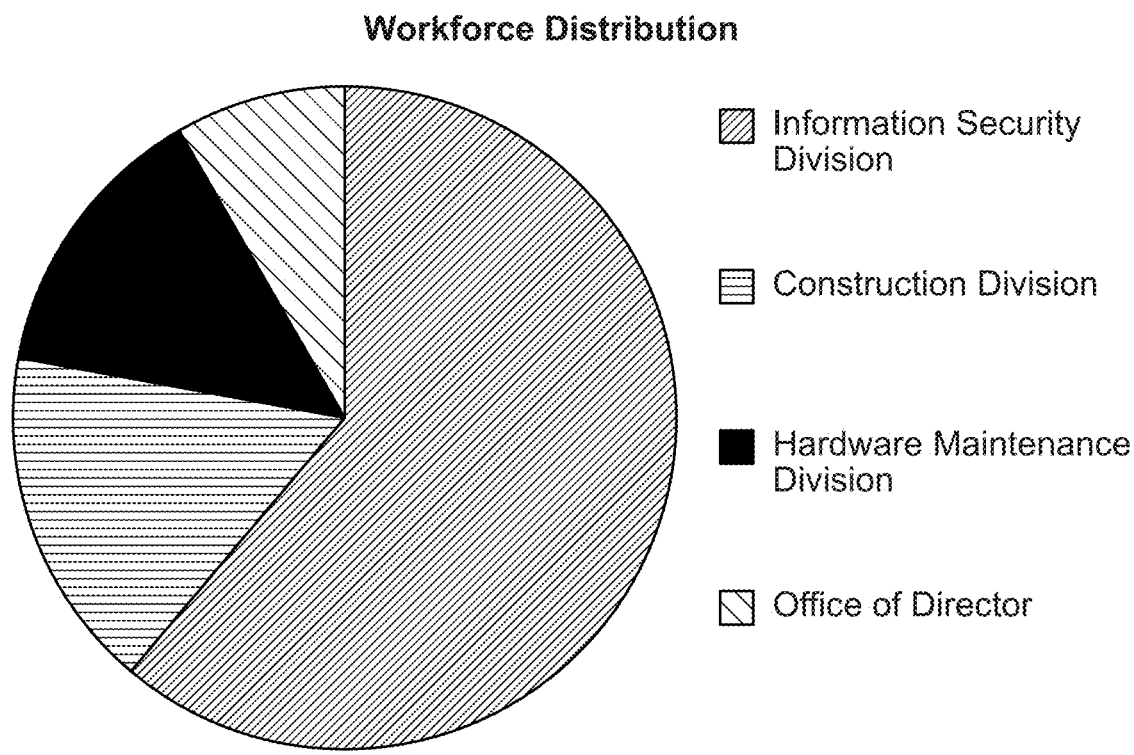
Figure 5D:
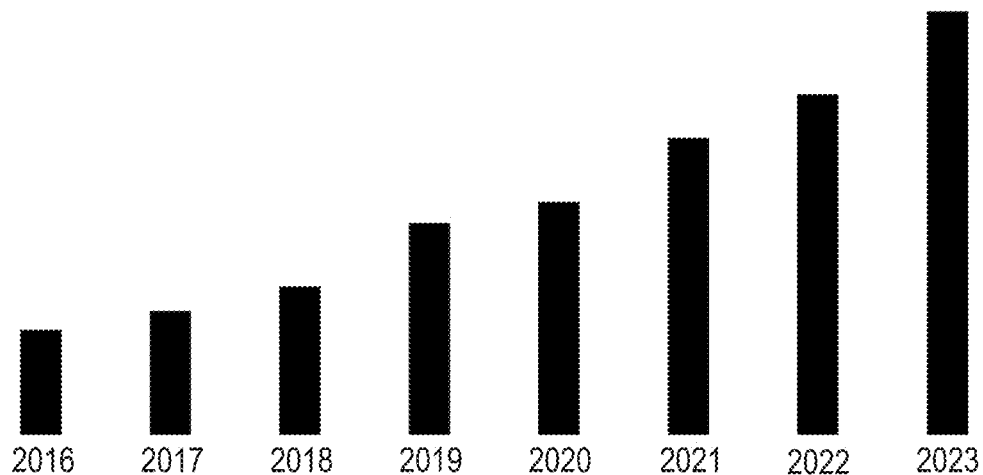
Figure 5E:
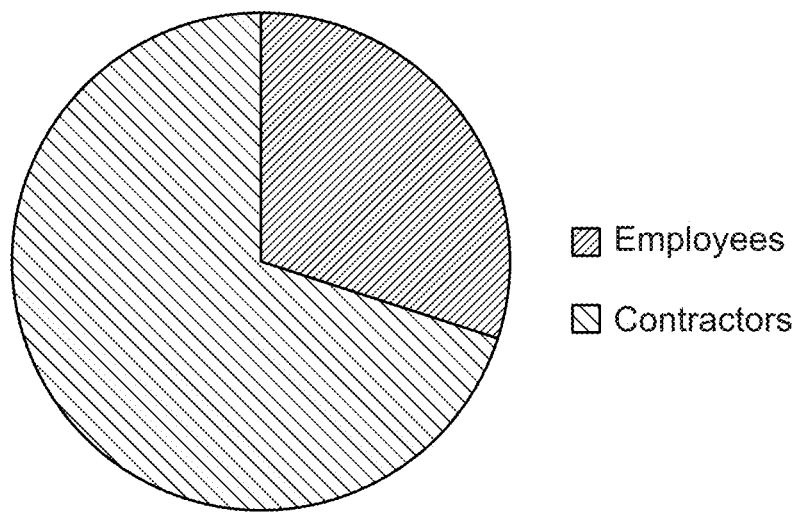
Figure 5F:
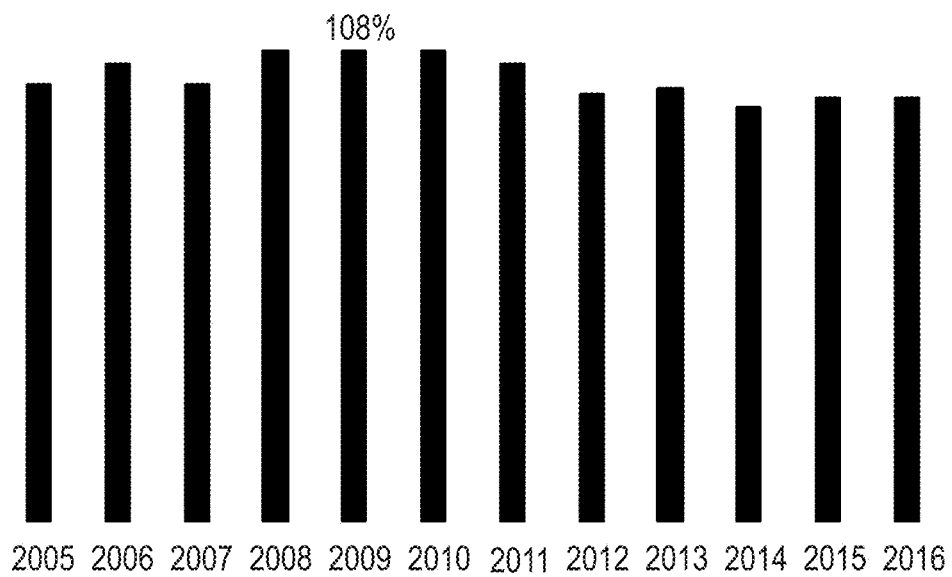

Workforce analysis may start with data obtained from the organization's Human Resources or personnel system, and provide various analyses of the workforce today, and how it changes over time. Workforce management system 100 may provide these analyses for the organization as a whole, or for any suborganization 206, 208. In many cases, the system may provide information that highlights a contrast between a specific suborganization and the organization as a whole, to identify outliers. Among the analyses that may be computed by workforce management system 100 are:

- Employee vs. contractor—this can be very informative, especially in government employers, where the hourly cost of contractors can be significantly lower than the hourly cost of employees. For example, FIG. 5(a) shows a graph that may be generated by workforce management system 100 to show the current ratio of contractors to employees. FIG. 5(b) shows this ratio over time.
- FIG. 5(c) shows the relative head counts in several divisions of the organization.
- FIG. 5(d) shows retirement eligibility, year-by-year, to prospectively estimate where retirements may occur, to identify suborganizations 206, 208 with potential gaps and to ensure sound succession planning. Where might big pay gaps develop?
- Attrition rate, and reasons for leaving (retired, left for other reason)? How has attrition been distributed by age, tenure, and occupational role? Which areas have greatest attrition?
- Cost data—this is especially important for budgeting.
- Distribution of the workforce among suborganizations 206, 208.
- Age, tenure, pay grade, time intend to stay, position series, and education level distribution by suborganization.
- Time off and overtime.
- Bivarying distributions and correlations that may be presented as 3D graphs or as tables, for example pay and grade and series distribution by age group, by tenure, or by intend to stay time.
- Comparisons of management preferences against actuals Referring to FIG. 5(d), workforce management system 100 may present analysis of retirement and attrition, both past trends and future predictions. The figure shows the proportion of employees and contractors that will be retirement-eligible in various future years. For example, in 2020, 15% will be retirement-eligible. By 2024, 25% of the current workforce will be retirement-eligible.

Social/economic multiple-choice questions may be used to further validate and expand workforce analysis. For example, correlation between attrition rates and employees' expectation to stay with the organization may provide additional information on the future of the organization.

Figure 5G:
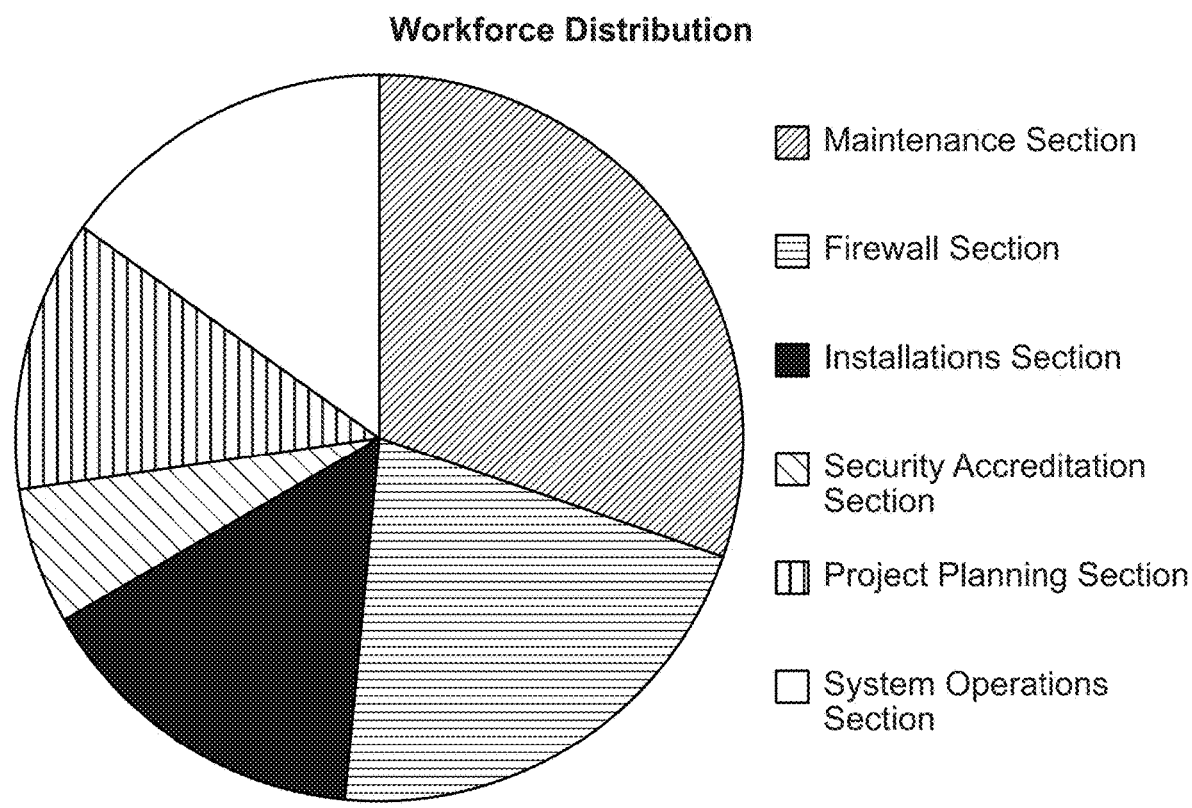
Figure 5H:
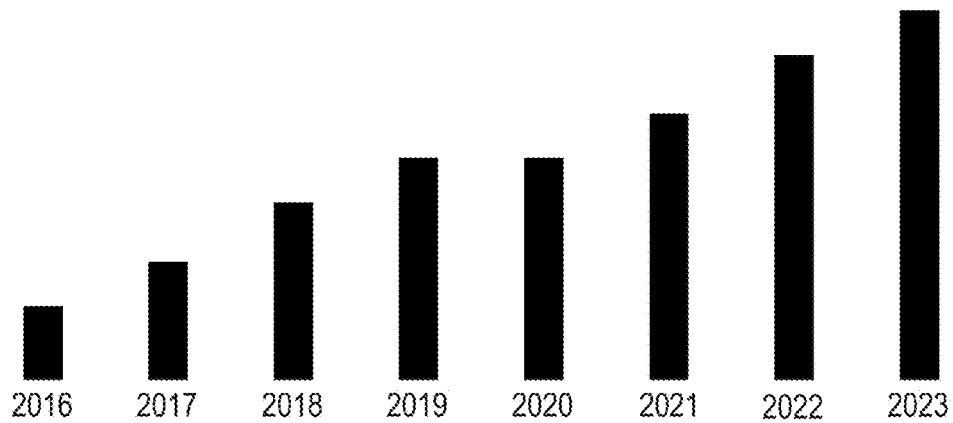

FIGS. 5(e) to 5(h) show analyses specific to a particular suborganization 206, 208 (largely mirroring similar analyses for the full organization shown in FIGS. 5(a) to 5(d)). By contrasting FIG. 5(e) against FIG. 5(a), and FIG. 5(h) against FIG. 5(d), workforce management system 100 shows that the retirement eligibility and attrition are similar for the division and full organization. By contrasting FIG. 5(f) (which shows employees, as opposed to contractors) against the lower parts of the bars in FIG. 5(b) (which likewise shows employees as opposed to contractors in the upper parts of the bars), the total employee population of the division and organization both remained relatively steady 2005 to 2010, then fell 10% to 15% during 2010 to 2016. This kind of comparative analysis may assist in hiring, contracting, and training decisions to make sure that the organization and its suborganizations 206, 208 maintain a sound headcount and seniority distribution. FIG. 5(g) gives a headcount breakout for the sections 208 of a division, scoping down from FIG. 5(c), which gave headcounts for the divisions of the entire organization.

V(C) Functional Analysis

The functional analysis features of workforce management system 100 may evaluate employees, FTEs, budget distribution, and other attributes at various points to mission model 310, and compare statistics among different points. Managers generally know their total budget, but often do not know budget or employee time breakdowns by function or activity. This information becomes especially important if a change in budget or mission is being considered.

Referring to FIG. 5(i), a pie chart may show distribution of people and their activities or competencies among different suborganizations 206, 208. Workforce management system 100 may provide a set of control radio buttons to select whether the pie chart is to show ratios of headcount, hours, or dollar cost (that is, FTE headcount or hours×hourly rate).

Referring to FIG. 5(j), workforce management system 100 may display in table form the managers' estimate of manpower required for given functions or activities. For example, FIG. 5(j), in column 530, shows that in the suborganization "System Operations Section," function "Manage and configure HR IDS database," management estimated that the function requires about 3.28 FTEs. (Any of the time allocation numbers may be entered in the specific user's choice of units—hours per week, hours per biweek, hours per month, hours per year, percent of total time, and workforce management system 100 may provide a feature that converts to another set of units, in this case, FTE equivalents total expended on the function.) However, as shown in column 532, the employee survey (and employee self-estimates of amount of time spent) shows that this function is performed by 1.64 employee FTEs. Management may decide to either reallocate time up from actual 1.64 to planned 3.28, or to adjust the planned 3.28 down to actual 1.64, based on the customer survey—if customers report that this function is performed satisfactorily, then management may reallocate 1.6 FTEs to other tasks. If customers report dissatisfaction, then management should help employees allocate more actual time to conform to estimated time.

In column 534, the total allocation of time is shown, split among employees, permanent contractors, and short-term contractors.

Workforce management system 100 may have graphing or table presentation capabilities to display the following statistics to a user:

Workforce Functional Load
  FTE distribution by function (for example, as shown for two suborganizations in FIG. 5(k))
  Employees' distribution by function or activity
  Contractors' distribution by function or activity
  Occupational series distribution by function or activity
  Retirement eligibility distribution by function or activity
  FTE distribution among activities or functions of critical/significant/general criticality
  Employees' distribution among activities or functions of critical/significant/general criticality
  Contractors' distribution among activities or functions of critical/significant/general criticality
  Management FTE requirement vs. actual FTE by function
  Management % of time vs. actual % of time by function
Budget Functional Load
  FTE distribution by function or activity
  Employees' distribution by function or activity
  Contractors' distribution by function or activity
  FTE distribution among activities or functions of critical/significant/general criticality
  Employees' distribution among activities or functions of critical/significant/general criticality
  Contractors' distribution among activities or functions of critical/significant/general criticality
  Gaps between management FTE requirement vs. actual FTE by function or activity V(D) Competency Analysis Competency analysis may assist management in identifying the most critical competencies for the organization and its missions, and in identifying any competency that has a proficiency gap, that is, those competencies where management believes a higher level proficiency is required vs. the present workforce offers (or believes it offers) a lower level. Gaps may arise between management's assessment for competency level requirements and the competency levels of the existing workforce, may arise due to changes due to recent employee departures that need to be filled, and due to future competency gaps that are likely to open because of retirement or other attrition, or may be a simple difference in perception between managers and employees. Workforce management system 100 may also offer predictions for which training activities will give the best return and fill the most common or most important gaps.

Competency analysis may assess immediate needs to fulfill critical missions and may assist in long-term planning to improve overall employee productivity through training. Among the statistics that may be presented are the following:

Proficiency for competencies: competencies may be grouped, or selected for graphing. This may be presented as an average over the entire organization, or for selected suborganizations 206, 208. Various breakouts may be provided, such as employee vs. contractor, by occupational series, and the like.
Average required proficiency for various competencies, with the same groupings and breakouts.
Average proficiency gap (see section V.D.1).
Competency training impact (see section V.D.2).

V.D.1. Proficiency Gap Analysis to Prevent Short-Term Mission Failure

Referring to FIGS. 5(m) to 5(r), competency analysis may identify gaps in competency that put the organization or mission at risk of failure. This analysis involves identifying gaps in competency (that is, differences between the proficiency that management believes necessary, and the proficiency that employees self-report) that lie on the critical path for the mission, or that lie at the most critical points of mission model 310.

Referring to FIGS. 5(m), 5(n), and 5(o), workforce management system 100 may provide an analysis of competencies at the level of an organization or suborganization 206, 208. Competency analysis compares managers' expectation for required level of competency with the self-reported level of competency provided by employees and contractors versus what is required. In FIG. 5(m), bars 542 show management's stated requirement for average competency, and bars 544 show employees' self-reported level of competency. In FIG. 5(m), employees believe that their average technical competencies are slightly lower than management believes to be required, but nearly equal. FIG. 5(n) shows a comparison of training and certification levels, and that the employees in this organization have somewhat better competency than contractors.

FIG. 5(o) shows a competency analysis for the most common fundamental competences. FIG. 5(p) shows a competency analysis for aggregate averages of the most common fundamental competences and the most common technical competences. Workforce management system 100 may present comparisons of management requirements against employee self-assessment or against customer survey results. Workforce management system 100 may allow a user to select which competency analyses to present:
  averages among groups of competencies (as in FIG. 5(m))
  averages among groups of employees/contractors (as in FIG. 5(n))
  the most common competencies (as shown in FIGS. 5(o) and 5(p))
  the competencies of highest criticality to a mission or function
  the competencies with highest headcount
  the competencies with highest cost (FTE headcount× hourly cost)

Referring to FIG. 5(q), for each competency, workforce management system 100 may compute a gap level, the difference between management expectation and employee self-assessment. In FIG. 5(q), the competency gaps are broken out to separate employees from contractors. In FIG. 5(r), workforce management system 100 has identified the fundamental competencies that have the largest competency gaps. A user may use a selection radio button to show the competency gaps to be displayed, whether most common, largest average gaps, or some other sorting criterion.

The various proficiency levels (fundamental, novice, intermediate, advanced, expert) may be assigned a numerical value (for example, from 1 to 5). Workforce management system 100 may compute a difference between management's requirement and employee self-assessment. Workforce management system 100 may in turn weight that gap based on the criticality of the competency to the activity, the criticality of the activity to the function, and the criticality of the function to the mission. In one example weighting, "general" criticality may be weighted 0.1, "essential" criticality may be weighted 0.3, and "critical" criticality may be weighted 1.0, and a weighted gap for each competency computed as:

gap(difference between management requirement and employee self-assessment)×(criticality weight for the competency to the activity)×(criticality weight for the activity to the function)×(criticality weight for the function to the mission)

By computing a weighted gap (using this formula or some other) for every competency, workforce management system 100 may locate the proficiency gaps that are largest and most critical to the mission. These employees can be targeted for training, as this is the training will yield most improvement for the organization.

Proficiency gap analysis may be computed for the organization as a whole. Additionally, workforce management system 100 may permit proficiency gap analysis for any part, such as a suborganization 206, 208, and may be limited to a part of mission model tree 310.

V.D.2. Competency Analysis to Enhance Long Term Organizational Fitness

Competency analysis may also be used to determine how to efficiently spend training dollars. One way to allocate training dollars can be to spend these dollars on competencies and employees with most effect on fulfillment of functions that are critical to critical missions. In this case, for each competence, workforce management system 100 may sum up the proficiency gap (either criticality weighted or unweighted) for each employee that is required to possess this competence. The higher this sum, the more effect that training in this specific competency will have on productivity because it directly takes into account number of employees that require the training.

In another possible implementation, a proficiency gap may be computed for each node in mission model 310 by summing the proficiency gaps for the nodes below:

$$\text{proficiency gap}_{activity} = \sum_{competency \in activity} \text{critically weight}_{competency} \times \text{proficiency gap}_{competency}$$

$$\text{proficiency gap}_{function} = \sum_{activity \in function} \text{critically weight}_{activity} \times \text{proficiency gap}_{activity}$$

$$\text{proficiency gap}_{mission} = \sum_{function \in mission} \text{critically weight}_{function} \times \text{proficiency gap}_{function}$$

In some cases, it may be helpful to identify proficiency gaps that lie on the most critical parts of mission model 310, and further weight those individuals' proficiency gaps by the number of employees in the organization. Training individual employees that contribute those specific proficiency gaps may improve performance for the teams with the largest number of individuals.

V(E) Organization and Workforce Development Analysis

Some analyses may assist in developing and restructuring the organization. For example, workforce management system 100 may:

Detect organizational competency strengths, and opportunities for improvement, and target the most effective training Detect common activities and common competency patterns across sub-organizations, to suggest combining two groups with similar responsibilities and give them dual reporting lines, to perhaps improve efficiency Detect functions with very low FTE allocations, workforce shortages, or workforce excesses, to suggest rebalancing.

VI. Assessment of Risk

Referring again to FIG. 6, one important calculation is risk of mission failure. This calculation may either be used for a number of purposes within workforce management system 100, such as an objective function for modeling (that the purpose of modeling is to reduce this risk), or as a constraint function (for example, if the modeling objective function is cost, then cost can only be reduced until risk of mission failure reaches some threshold.).

Risk may be measured as a subjective measure, the amount of insecurity perceived by a manager (or any manager higher in the organization chart) for fulfillment of the missions committed to the manager's organization 206, 208. Most managers are able to estimate failure risk for specific and low-level projects (e.g., activities in the mission model) but as the complexity, generality, and level of a node in an organization chart or mission model rises (e.g., missions in the mission model), estimation of failure becomes more difficult, both numerically and subjectively. Workforce management system 100 may provide an analytical platform for assessing risk of failure of an organization based on more-reliable estimates of risk for individual functions.

By this definition, risk is a subjective assessment that incorporates various factors that may endanger mission execution. Risk assessments are inherently time specific. This measurement of risk may be advantageous because no single numerical score can capture all of the factors that may influence outcome, and attempting to do so will force system designers to rely too much on one specific set of assumptions about a business, when other businesses may not follow those assumptions. Trying to pin a number on a risk definition that considers too few factors may lead to a "garbage in, garbage out" computation that appears authoritative because it is numerical, but that actually lacks any predictive power. To avoid this trap, workforce management system 100 relies on managers' knowledge of the business, and works to uncover and assemble knowledge that exists within the organization, and identifies where different people have conflicting views, rather than trying to manage the business.

One calculation for mission failure is to indentify a number or criticality of functions that must fail to cause a mission failure sufficient to cause the manager to be fired. For example, the objective function might specify mission failure if a single critical function fails, or if two essential functions fail. For example, if the objective function is probability of mission failure, the manager may assess some risk of affected activities, workforce management system 100 may ask the manager to estimate risk for the reconfigured organization, and workforce management system 100 may then calculate the probability of mission failure.

After all management adjustments (employee reassignment, reorganization, etc.) are completed, and calculated values are displayed, workforce management system 100 may request that management assign a subjective assessment of risk to certain points in mission model 310 based on the displayed results. From that assignment of risk, workforce management system 100 may compute a probability of mission failure. If management believes that the mission will fail if any two functions fail, then the total probability of failure of the function is the sum of all pair-wise failures (that is, for i and j each varying over all functions of a mission, the sum of all pairwise probabilities of failure);

$$\text{risk} = \sum_{i,j \in functions} (Pr(\text{failure}_i) \mid Pr(\text{failure}_j)) \times Pr(\text{failure}_j)$$

If the failures are statistically independent, then the probabilities of failure can be simply multiplied. More generally, for missions that can proceed with two failures, but fail on three, the formula is $$\sum_{A\in\{1,2,\ldots,n\},|A|=k}\left\{\left(\prod_{i\in A}p_i\right)\left(\prod_{j\in\{1,2,\ldots,n\}\setminus A}(1-p_j)\right)\right\}$$

where $p_i$ and $p_j$ are probability of failure of function i and function j, correspondingly, vertical bars are the cardinality operator, A is a subset of cardinality k of functions that failed, and backslash is the complement operator, "in the set universe but not an element of.".

As shown in FIG. 6, workforce management system 100 may offer a manager a dialog box in which to estimate probabilities of failure of various functions and/or activities, and from there may calculate a probability of failure. The manager may work through several scenarios until identifying the one with the combination of cost, delay, probability of failure, and effect on customers.

For example, for an optimization modeling objective function or figure of merit, or for a boundary constraint, risk may be calculated in a number of different ways, including:

risk=(probability of zero critical missions failing, and no more than one essential mission failing) or (probability of two missions failing) weighted by amount of budget overrun or weighted sum of competency gaps(one example computation is given in section V.D.1), with each competency/proficiency stepped down 0.1 units for each 3% budget cut or each 2% reduction in time allocation below current levels or some weighted computation that incorporates risk of mission failure, budget, employee and customer satisfaction risk of mission failure=probability that any one critical function fails+probability that three essential functions fail probability of function failure=probability that any one critical activity fails+probability that any two essential functions fail probability of activity succeeding=min(1.0,(1.0−(1.0−time actually allocated to performance of the activity/time believed necessary for the activity)$^2$))−proportion of competencies where average employee self-assessed proficiency is at least 0.5 levels below management's required proficiency VII. Phase 5: Predictive Modeling of Organizational Changes Workforce management system 100 may provide predictive modeling to assist managers in responding to perturbations, typically externally imposed, such as increases or decreases in budget; reduced, enlarged, or redefined mission statements; changes in hiring or attrition rates or other workforce changes; changes in required competency (for example, because of introduction of new technology or a new problem arising in the external world) or training in a competency; organizational restructuring; changes in other external factors, and the like. Managers adjust to these perturbations by adjusting their resources, while meeting requirements for budget and minimum risk of mission failure. Workforce management system 100 may provide a "testing sandbox" for managers to experiment to ascertain proper adjustment to make in response to the perturbation, for example, by hiring or cutting employees, reassigning employee duties or time allocations, training of employees, reorganization of the organizational structure, and the like. Workforce management system 100 may calculate a value of an objective function or figure of merit, for example, cost, delay of deliverables, or probability of mission failure. The objective function may be computed as some weighted or balanced combination of several of these, for example, some computation of minimum budget at acceptable risk. The manager may experiment with varying factors to find a configuration that improves the objective function, such as minimum risk of mission failure.

VII (A) Computational Modeling

Predictive modeling in workforce management system 100 may be based on an objective function to be maximized. The objective function collects information throughout the model and reduces it to one figure of merit, and the goal is to find a configuration of the system that maximizes (or minimizes) that figure of merit.

Workforce management system 100 may allow the manager to enter a perturbation (generally, but not necessarily, factors outside the manager's control: a budget cut, loss of a key employee, a change in the definition of the mission, an organizational restructuring imposed from outside, a natural disaster that removes some essential resource, etc.) and then allow the manager to try several "what if" scenarios for factors within the manager's control (training employees, restructuring the manager's own organization, cutting or hiring employees, reducing costs of external purchases, and the like). Alternatively, the manager may ask workforce management system 100 generate alternative organizational configurations, and present them to management as suggestions. Workforce management system 100 may then calculate the objective function and allow the manager to compare multiple scenarios to evaluate among options. This initial set of workforce assignments can be adjusted by a user running the modeling to reflect a personal management approach, and/or scenarios generated by the optimization algorithm to investigate alternative budget allocations.

Each gaming scenario may be an iterative process:

(1) the external perturbation is applied throughout the organizational and mission models, typically by management manually updating the models, (2) management specifies an appropriate objective function to be optimized and constraints that must be satisfied, (3) workforce management system 100 guides managers through the organizational chart and mission model so that management may apply their responsive management adjustments (apportioning budget and personnel cuts through the organization, organizational restructuring, employee reassignments, etc.), or (4) In some cases, workforce management system 100 may use optimization algorithms (for example, linear programming, genetic algorithms on randomly-generated reallocations, and the like) to find an allocation among alternatives to optimize some merit function (for example, lowest budget, lowest risk of failure, etc.) subject to required constraints (e.g., budget requirements, the projected rate of hiring, etc.). The optimization algorithm may vary team composition criteria, training and proficiency levels, and the like, to describe an acceptable team composition (set of competencies and experience) to complete specific function(s) of mission model 310.

(5) management may estimate some characteristics that are best evaluated subjectively, (6) workforce management system 100 may compute one or more alternative organizational configurations, or assist managers in manually reconfiguring the organization.

(7) workforce management system 100 computes effects, especially the objective function.

Steps 3, 4, 5, and 6 (and perhaps step 2) may be iterated until a solution converges at a best value for the objective function.

Referring to FIGS. 7(*a*) to 7(*k*), predictive modeling of workforce management system 100 may suggest configurations of an organization, including allocation of employees among suborganizations and mission/function/activity tasks. Workforce management system 100 may coordinate an interactive dialog between human managers and predictive modeling software, to propose variations in staffing levels, allocations of specific employees to specific suborganizations, and budget levels, and the like. The predictive modeling feature may evaluate fitness of various configurations to meet objectives specified by management, and the manager may accept or reject various hypotheses, for example based on the managers' work experience, industry experience, and institutional knowledge. Managers may refine computed suggestions, or suggest further variations. The predictive modeling computation and human managers may work together within workforce management system 100 to identify a suggested configuration for the organization, and management may select or reject the recommendation.

In some cases, workforce management system 100 may operate on the assumption that software can't independently create or simulate all possible business scenarios and that only business managers know intricate details of their business. Much information is not available to workforce management system 100, for example, interpersonal relations. Thus, predictive modeling may use a two-step, iterative process—first an automatic calculation of a model, then manual tuning of personnel assignment and the like. These steps may be iterated between human tuning, computed modeling and optimization, human tuning, etc. until the manager is satisfied with the result.

Workforce management system 100 may provide several different predictive modeling scenarios, including budget cut, mission change, and organizational restructuring. A user/manager may navigate to the predictive modeling home page, and select from among these three, or combinations of the three.

VII (B) Budget Cut

Referring to FIG. 7(*a*) in a budget cut, the goal is to achieve or approximate a desired budget target (BT) while at the same time minimizing impact on the ability of the organization to fulfill its mission. Two metrics are defined to score such impact:

loss in mission engagement (ME), i.e., the total loss in employee assignments measured specifically by the category of mission criticality of the impacted functions; and loss in institutional knowledge (IK), i.e., the total loss in employee competency within the context of impacted functions.

A detailed sequence of steps for one possible implementation of a budget cut predictive modeling is as follows.

VII.B.1. Manual Distribution of a Budget Cut

In some cases, a manager may elect to distribute the budget cut over the organization manually. FIGS. 7(*b*), 7(*c*), and 7(*d*) walk through a scenario of a budget cut. Managers distribute the cut throughout the organization and its tasks, and then workforce management system 100 computes effect on mission fulfillment. In FIG. 7(*b*), when managers are confronted with a need for a budget cut, workforce management system 100 displays the high-level budget divisions, with current budget (column 722), and data boxes to receive adjusted budget allocations (columns 724, 726). In FIG. 7(*c*), the budget cut is propagated down through mission model 310 from divisions to missions to functions 732. Workforce management system 100 shows the user all functions 732 of a division and a corresponding cost (calculated based on salary and time allocation of employees that perform that function). In FIG. 7(*c*), this cost is shown in two columns, managers' estimated cost (col. 734), and employee self-reported actual cost (col. 736). The user is allowed to assign a new cost to functions by reallocating employee time, etc. (col. 738). In FIG. 7(*c*), column 737 is the criticality for the function (by reminding managers that certain functions are critical, workforce management system 100 may encourage managers to cut critical functions less than routine functions), col. 734 is the current budget estimate, col. 736 is actual expenditure in the last budget period, and col. 738 is the input box that allows the manager to allocate the reduced budget to various functions.

VII.B.2. Automated Modeling of a Budget Cut

In other cases, the manager may elect to have workforce management system 100 calculate several options for distributing the budget cut over the organization.

To model a budget cut, the user/manager may select a target amount of budget reduction. In the example of FIG. 7(*a*), the user/manager selects a target budget reduction of 15%. The user/manager may then select criteria for spreading that budget cut over an organization. Among criteria that may be offered by workforce management system 100, examples may include:

Even spread 712—all divisions' budgets are cut by the same proportion relative to current budgets.

Spread reduction with sensitivity to criticality of missions and functions within the mission model 310—for example, cuts to critical functions may be capped at the amount that compromises reliable performance Institutional knowledge 713—preserving as much as feasible institutional knowledge in performance of mission-critical functions while achieving required budget cuts. Older employees have more instructional knowledge, but as they near retirement age, the remaining years of benefit of that knowledge reduces.

Criticality and expertise 714—to the degree feasible, preserve those employees currently associated with critical functions, and whose proficiencies best match the required competencies for mission-critical functions while achieving required budget cuts. Expertise and lack of a backup with equivalent expertise are factors considered under this criterion.

Within those three broad criteria, the user/manager may further specify weights for other factors, such as retirement eligibility 716. Likewise, the manager may specify preferred tools for achieving the goal, such as buy-out or early retirement campaigns 718, to reduce the number of involuntary lay-offs.

Retirement eligibility 716—for reduction in force or voluntary severance/buy-out, favor retirement-eligible employees, and only if there's remaining budget that needs to be cut, then continue with non-retirement eligible employees based on other criteria (such as performance, criticality, and institutional knowledge). Reasons for favoring retirement-eligible employees include fairness (they will continue to have an income even after being removed from the manager's payroll), and because their departure and loss of institutional knowledge is imminent and unpredictable.

If the budget cut cannot be satisfied by retirement-eligible employees, the user/manager may select that near-eligible employees may be offered other incentives to attrit, such as a voluntary severance buy-out 717, or early retirement 718.

FIG. 7(*a*) shows selection by radio buttons, all one and none of the others. In other cases, these criteria may be blended, by a picker among three criteria plotted in a plane, by sliders, etc.

Once criteria are selected, the user/manager may click on the "Suggest Model" button and the system performs computer simulation based on the selected criteria.

Predictive modeling may proceed by assuming that each employee in the existing workforce can be assigned one of two states, on (or 1, or retain) or off (or 0, or reduce), and that initially each employee $e_i$, where i=1, . . . , m, is in the On state. The task is to find a combination of employee On/Off states, StateSet=[$State_{e_1}$, . . . , $State_{e_m}$], which would best satisfy various boundary constraints:

(1) $BT - \in \leq f_B(StateSet) = \sum_{i=1}^{m} Salary_{e_i} * State_{e_i} \leq BT + \in$
(2) the organization must meet its mission commitments, as discussed in section VII
(3) $\max f_{ME}(StateSet) = \max(ME_{e_1} + \ldots + ME_{e_m})$
(4) $\max f_{IK}(StateSet) = \max(IK_{e_1} + \ldots + IK_{e_m})$
(5) maximum budget, maximum slippage in deadline completions
(6) full-time salaried employees may not exceed a maximum of 1920 hours/year
(7) some maximum hiring rate, for example, new employees can be hired and trained at most once per quarter, and new contractors at most once monthly
(8) risk of mission failure (for example, calculated in section VI) must stay below some threshold value where ∈—the admissible margin of approximation; any budget that falls within this margin is considered to be satisfying of the budget target BT
$f_B$—achieved budget as a function of the StateSet
$Salary_{e_i}$—the salary of employee i. In this simple example, equation (1) only considers direct salary costs. If employees are offered a buyout, then future salary may be combined with the buyout amount (for example, by reducing three years of salary to present value, and then adding the buyout severance amount). In some cases, retirement costs may be added in, as well.
$State_{e_i}$—the state of employee
$f_{ME}$ and $f_{IK}$—Mission Engagement and Institutional Knowledge score, respectively, calculated as a function of the StateSet
$ME_{e_i}$ and $IK_{e_i}$—the Mission Engagement and Institutional Knowledge scores estimated for an individual employee $e_i$. Depending on their state—On or Off—their scores may contribute to the aggregate enterprise score or constitute a loss. The two scores are derived by totaling up the employee contribution across the functions they are assigned to, $F_i$, where i=1, . . . , n:

$$ME_{e_i} = \sum_{F=1}^{n} CC_F * FTE_F^{ei}$$

$$IK_{e_i} = \sum_{F=1}^{n} IK_F * FTE_F^{ei}$$

$CC_F$ stands for "category of criticality" of the function F in fulfilling the enterprise mission; and $IK_F$ stands for "institutional knowledge" contribution by the employee within the context of the function performed by that employee.

One possible mathematical model is represented by four linear relationships (1), (2), (3), and (4), in a fixed-size set of variables $e_i$. This model differs from a classic linear programming problem that deals with maximization of one function under a set of constraints, in that some of the functions are discrete-valued rather than linear real values (such as number of employees, whether a division is cut or not, qualitative assessments such as criticality, and the like). The modeling computation is to find a maximum of equations (3) and (4) under constraints (1) and (2). Other models are possible, to track and weight more variables relating to each employee, how that employee is deployed in the organization, scarcity of alternatives, cost externalities, and the like, but for explanatory purposes, this discussion will focus on this simpler approach, and finding an "optimal" (in the "approximately optimal" sense of operations research and modeling theory) solution to solving this system:

(9) Using the ellipsoid algorithm for linear programming, the system finds a solution for objective function (3) under constraints (1) and (2).
(10) Using the ellipsoid algorithm for linear programming, the system finds solutions for objective function (4) under constraints (1) and (2) within the result solutions found by step (9).
(11) In many cases, the search for a solution to calculations (9) and (10) begins by locating the critical activities of critical functions of critical missions, and fitting the most proficient employees into those roles.
(12) The system repeats calculations (9) and (10) in the reverse order, first finding a solution to objective function (4) and applying this solution as an additional constraint to objective function (3).
(13) The system combines results of (10) and (12) and presents it to the user/manager as draft versions for consideration and adjustment.
(14) If the user/manager chooses to optimize for criticality/expertise, the system performs only the (9)-(10) portion of the algorithm. If the user/manager chooses to optimize for institutional knowledge, the system computes only solution (12).

VII.B.3. Offering Computed Suggestions to the User

Referring to FIG. 7(*e*), workforce management system 100 may present the user/manager with one or more proposals resulting from simulation. The display may start with a top-level view of the organization. In this particular scenario, workforce management system 100 presents five proposals 751 for achieving a 15% budget reduction. For each of the five proposals, the system shows cost reduction achieved 752, number of people affected 753, effects on likelihood of mission fulfillment 754, and loss of institutional knowledge 755. The mission fulfillment and institutional knowledge scores 754, 755 are in arbitrary units to permit comparison, but that have no independent meaning.

Referring to FIG. 7(*f*), after management has allocated budget cuts and considered cutting specific employees, FIG. 7(*f*) shows where gaps may have opened. The upper section of FIG. 7(*f*) shows counts of Number (or percentage) 764 of functions that have sufficient time allocated to be fulfilled
Number (or percentage) 765 of functions that have insufficient time allocated
Number (or percentage) 766 of functions that have excess time allocated, so that time can be reallocated from these tasks to the functions with insufficient time Mission model 310 has sufficient information to sum up the time allocations for all employees. From that, the middle section of FIG. 7(*f*) shows:

Number (or percentage) 767 of employees/contractors at full utilization (for most employees, 1920 hours/year)
Number (or percentage) 768 of employees/contractors that are underutilized
Number (or percentage) 769 of employees/contractors that are over-committed Workforce management system 100 may also sum up a total budget, performance completeness, and failure risk for the model organization and mission. These computations may assist the manager in reallocating resources to adapt to the budget cut to provide maximum mission coverage, without over-committing employees. Workforce management system 100 may assist a user in iterating through multiple configurations to find the best tradeoff to satisfy their criteria or to maximize these numerical objective function.

After the five proposals, the lower part of the page expands one of the proposals in detail. The proposal to be displayed in detail is selected by radio button 756. The radio button on the first proposal indicates that the detail table in the lower part of the page elaborates the first proposal. The detail table shows a list of top level divisions 757 in the organization. The first two columns 758 show current budget and the amount of reduction for this proposal. A fourth column 759, labeled "Achieved," includes an editable input box, initially seeded with the amount of the budget cut for that division, and permitting a user/manager to adjust the amount of the cut. The newly-calculated budgets may be displayed in three colors:

red if the newly modeled budget exceeds the target
green if the newly modeled budget as at least 5% under the target;
black if the modeled budget is between 95% and 100% of target Next to the table there are two buttons: a "Show Summary" button 761 and a "Recalculate" button 762. After the user/manager retunes numbers in column 759, the "recalculate" button may cause workforce management system 100 to recalculate alternative possible allocations of the budget cut throughout the organization. Throughout the system "Recalculate" button is used to perform calculations (1)-(14) with new, adjusted, conditions. For example, in FIG. 7(*e*) modification of the numbers in "Achieved" column 759 for any division will result in recalculation of this draft with new condition that reflects fixed budget for specific division.

Referring to FIGS. 7(*e*) and 7(*j*), throughout the predictive modeling phases of workforce management system 100, the various screens include a "Show Summary" button that reruns the simulation, and takes the user/manager to a screen (FIG. 7(*e*)) that shows the impact of the simulated proposal on the organization's ability to perform its functions and mission.

VII.B.4. Manual Further Adjustment

Workforce management system 100 desirably provides an ability to adjust nearly any parameter of the model to create alternative scenarios. Among the parameters that can be adjusted are the following:

Adjust mission model 310, for example to reallocate activities within functions.
Adjust performance standards for various activities—perhaps performance to a lower standard will have relatively small effect on outcome as perceived by customers.
Adjust performance standards and/or criticality for an activity that is used in multiple functions or parts of the organization—the output of an activity may be critical in one context, and lower criticality for its other contexts, which may permit it to be performed in a reduced-cost fashion.
Reassign people among tasks, remove people, or add people to an activity.
Train employees so that with a modest increase in cost, the employee can raise performance.

As a practical matter, adaptation and modeling will center on "essential" functions and activities. Managers know that for "critical" functions and activities, any significant cut or other encumberment has a high likelihood of causing a failure. For "general" criticality functions, failure is tolerable. Therefore, generally, the important balancing is among "essential" functions, to reduce resource demands without raising risk of mission failure to unacceptable levels. On the other hand, even "essential" functions can become critical, for example, if necessary maintenance is deferred for too long.

As these parameters are adjusted, workforce management system 100 may automatically recalculate FTE counts, costs, delays, and other numerical parameters, and provide a comparison between cost under current plan vs. the cost under the adjusted plan.

VII.B.5. Displaying Modeling Results to the User

Referring to FIG. 7(*g*), when a user expands one of the proposals 951 (of FIG. 7(*e*)), the proposal is expanded to show the effect on suborganization 771 or function. For each expanded suborganization 771 or function, the screen of FIG. 7(*g*) shows loss or reassignment of employees, and lists the employees that might be lost due to budget cuts. At the top of each function or organization 771 is a list of affected employees 772 and "On/Off" button for each employee. This button provides the user/manager with an opportunity to mark specific employees as "untouchable" and recalculate the optimization model.

The user/manager has an opportunity to click on any division 771 of FIG. 7(*g*) to navigate down to the next level in the organization tree. At that level, the system presents a new page, also with a list of suborganizations, and potential employees and budget effects on that suborganization.

Referring to FIGS. 7(*h*) and 7(*i*), as various reconfigurations of the organization chart and mission model are modeled, workforce management system 100 may recompute various statistics of the system. For example, FIG. 7(*h*) shows a configuration with one allocation among activities, contrasted against FIG. 7(*i*) with a different allocation. Referring again to FIG. 6, workforce management system 100 may calculate a probability of failure for each configuration, so that management may choose among the reconfigurations, to determine optimal workforce assignments that meet budget and mission constraints.

Referring to FIGS. 7(*j*) and 7(*k*), at the lowest level of the organization tree, where there are no more suborganizations, the detail table is populated with the functions and activities 781 executed by the suborganization. Under every activity is displayed a list of employees 782 assigned to it, along with the self-reported time percentage (FTE) 783 that the employee spent on the function or activity. Lastly, at the bottom of the page, there is a complete list 785 of division employees along with an "On/Off" toggle button for each employee to indicate their inclusion on the list under the current proposal. This list provides a set of On/Off buttons and adjustable FTE values 785 to allow the user/manager to adjust and reallocate employee time allocations. After these adjustments, the user/manager may click "Show Impact Summary" to recalculate effects on the organization, for example, using the modeling equations (1)-(14), to present the function/activity's cost compared with a newly assigned cost.

The user/manager may navigate down the organization tree, and navigate back up one level at a time by clicking on a breadcrumb link at the top of the page. The user/manager may traverse the entire organization, at all its levels, by navigating up and down every branch of the organization, either through the organization tree, or mission/function/activity model, as needed. Referring again to FIG. 7(e), on return to the top level, the user/manager may select various proposals, examine their data, adjust parameters, etc. to find a preferred reallocation of people.

Calculations and steps (1)-(14), and adjustments to various employee allocations, in various combinations, can be repeated as many times as needed. Together they provide much flexibility in terms of producing the final draft.

At the end of the session, the user/manager may select any of the draft proposals to be saved for future comparison, using the "Save Model" button and name the new model to be stored in the database.

VII (C) Mission Change

External forces may impose a change in mission. This may be imposed as a quantitative change in functional load (either an increase or decrease), a qualitative change in the job, a change in customer satisfaction standards, a redefinition of the product under development, etc. Management may first adapt mission model 310 by adding one or more functions, deleting one or more functions, reassigning, hiring or training of employees, and reworking the activities and competencies of mission model 310 accordingly. The rework of mission model 310 (from section III) may be quite extensive, especially in estimating time requirements for functions and activities. From there, other parameters may be affected—for example, if a function or activity is deleted, then the employees that perform this function will be underutilized. These employees may need to be shifted to other parts of the organization, let go, retrained for other tasks, and so forth. Managers may adjust these parameters as discussed in section VII (D), and workforce management system 100 may respond by computing various objective functions, as described in section VI, until a desired combination of adjustments is found.

Mission change modeling may include changes in functional load and/or mission—addition or elimination of missions and/or functions, or rebalancing of priorities. Productivity may be improved through training and/or hiring (as discussed in section VII), or by changing the mission definition or organization structure, and reassigning employees.

Workforce management system 100 may allow the user/manager to alter the mission model, and workforce management system 100 may then compute an optimal mapping of existing workforce to the new mission model.

Recall that the mission model 310 has two structural components: a hierarchical mission/functions/activities/competencies structure (described in section III (A)) and organizational structure (as described in section II). Each mission model is a mapping between the nodes of these two components. Modification of any of these components creates a new mission model. Each change offers the possibility (or requirement) to reassign employees to improve organization performance.

A mission change generally arises through either a change of direction flowing from management, a change in environmental factors, a change in services or results demanded, added or deleted functions, or expansion or contraction of mission and/or headcount because of change in budget, or new information that changes management preferences among various priorities. The survey of employees for their competencies (see sections IV (A) and IV (B)) allows for analysis at a granular level. The modeling capability of workforce management system 100 may help find a near-optimum distribution of people among new functions, to match their skills and activity history to roles needed in the organization, advise on employees to be reassigned to another organization, advise on those to be retained, and suggest skills that may need to be hired from outside or offered through training to existing employees. Where a budget cut had only one degree of freedom—reducing head count—a mission change can offer multiple degrees of freedom, including hiring, training, and reorganizing the organization to achieve efficiencies.

Other mechanisms for finding solutions to problems (3) and (4) under constraints (1) and (2) may be used, and may be more suitable for mission change modeling. For example, genetic algorithms may be used to combine solutions from previous iterations, to successively iterate and refine possible solutions.

In suggesting employee reassignment, workforce management system 100 may focus on matching employees to roles, to ensure that critical missions and critical functions are fulfilled, and then fill in the rest of the organization. Because workforce management system 100 has a rich understanding of the critical functions of the organization, and the proficiencies of the employees, workforce management system 100 can find a good fit between those employees and functions.

VII (D) Organizational Restructure

Likewise, if an external decision forces a change to organizational structure, workforce management system 100 may assist management in shaping adaptations and choosing among them based on the objective function defined by management.

Usually, the goal of organizational restructuring is to improve organizational performance through work consolidation. Managers consider new organizational structures (restructuring) in reaction to mission changes, to improve performance by consolidating certain functions in the organization. A user/manager may select missions/functional areas that are targeted for restructuring, and may indicate expected performance improvement in those areas. Organizational restructuring may be appropriate when a single person performs multiple functions—most employees are more effective if they have a consolidated reporting line, and are not asked to report to multiple managers. Similarly, if a similar function is spread among multiple points of an organization, a restructure that consolidates all employees that do that function may permit them to function more efficiently. Managers seek to group people as best they can—while there is no perfect organization chart, workforce management system 100 may help evaluate various possibilities, and help reduce risks of bad choices.

Referring to FIG. 7(d), workforce management system 100 may present the user with the current allocation of the entire budget among the employees 742, and a box in which the manager can enter an adjusted budget number for each employee 744. The manager may eliminate employees, change the amount of the employee's time allocated to a given function, etc.

The human user/manager may use the model-build techniques of sections II, III (A), and III (F) to propose a new organizational structure to workforce management system 100. Workforce management system 100 may compute a best-fit distribution of employees into the new organizational structure using optimization techniques analogous to those discussed for budget cuts and mission changes. Employees may be assigned organizational units while ensuring that performance of mission-critical functions does not fall below risk tolerances (calculations (3)-(14) under constraints (1) and (2)). The user/manager may also set target performance improvements that are desired, and use modeling to confirm whether the proposed reorganization is likely to achieve those performance improvements, or to free up employees for reassignment.

VII (E) Trial Copies of the Organization Chart and Mission Model

During predictive modeling, workforce management system 100 may create "sandbox" copies of the org chart and mission model that can be alternated, changed, saved, and discarded. These may be stored as "deltas" from the primary organization model and mission model, storing only those portions that are changed (or perhaps even only the individual parameters that are changed), so that it is always possible to return to the existing plan of record to compare it to the sandbox model.

At the end of modeling, workforce management system 100 may provide a "commit" function that updates the organization and mission models with selected ones of the sandbox temporary deltas.

VIII. Report Generator

Workforce management system 100 may gather enormous amounts of data about an organization, its functions, and the organization's culture and goals, and how individual employee's skills and goals fit. In order to organize this data into information that is helpful to managers in making decisions, workforce management system 100 may use relational and regression analysis. These two analyses may be used to detect how different attributes of the organization interact, to generate reports and to guide managers among the proposals developed during predictive modeling.

Relational analysis looks for variables that are more highly correlated than expected, and to detect variables that have no meaningful correlation.

For example, imagine a manager that is worried about a high rate of attrition in his organization. If it turns out that there is almost no correlation between years of experience and the functions that an employee is currently performing, then the manager has some insight. On the other hand, if there is a correlation between an employee's current job functions and the time that this employee expects to leave, that gives the manager other insight, about tasks that the organization can and cannot undertake. Finding correlations with age would further refine those insights.

Computer graphing is very good for two-variable plotting, and feasible for three dimensions that can be rendered as a three-dimensional surface graph. Relational analysis can predict which pairs or triples of variables have interesting correlations and should be plotted.

In one embodiment, the system may perform correlation analyses among many pairs of data series, and report the eight to ten pairs of series that are highly correlated to each other.

Regression analysis allows workforce management system 100 to predict future events. For example, it may predict stability or instability of a workforce, willingness to move to new functions, and the like.

IX. Computer Implementation

Various processes described herein may be implemented by appropriately programmed general purpose computers, special purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogenous media that may be read and/or written by a computer, a processor or a like device. Data structures may be stored in the RAM of a computer, on disk, as entries of a database management system, or in other storage media. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A method, comprising the steps of:
    storing into the memory of a digital computer a plurality of data structures describing suborganizations of an organization, the suborganization nodes arranged in a hierarchy reflecting the reporting hierarchy of the suborganizations;
    storing into the computer memory a plurality of data structures describing respective tasks to be performed by the organization under management by the one or more managers, the task data structures arranged in a hierarchy corresponding to the dependence hierarchy of the tasks, the data for task nodes including levels of competency desired by management for performance of the task, the task data structures describing managers' priority levels for the respective tasks;
    by computer, querying staff members of the group to obtain staff assessments of the degree to which the group meets the requested levels of the resources, including the degree to which staff have proficiency in the competencies, and storing into the memory of a digital computer data structures describing employees of the organization, the employee data structures including data describing the staff assessments of employee proficiency of specific employees for specific tasks from among the organization's tasks;
    in a processor of the digital computer, comparing the managers' requested levels and the staff assessments to identify mismatches between the requests and assessments; and
    reporting the mismatches to the managers;
    in a processor of the digital computer, computing an allocation of employee data structures to the suborganization data structures based on the stored task priority data and stored proficiency data, the allocation reflecting a computed optimization of allocations, the computation:
        creating a number of trial allocations of employee data structures among suborganization data structures,
        computing a value of an objective function for the trial allocations of employee data structures among suborganization data structures, and
        choosing from among the trial allocations with best objective function, the objective function modeling the organization's ability to perform its highest priority tasks and at least one of the group consisting of:
            reduction of the organization's costs,
            in any reduction in force, recommend employees that are retirement-eligible,
            in any reduction in force, recommend employees that are near retirement,
            assignment of employees that have high proficiencies in high priority tasks with specific tasks that are of high priority,
    by computer, reporting the computed optimization of allocation to the managers;
    by computer, receiving from the managers one or more perturbations of the suborganization data structures and/or task data structures to reflect adaptations to the group that the managers may make to respond to the changed imposed requirement; and
    by computer, computing a value of the objective function of the model under each of the perturbations, and providing the computed objective function values in a form that permits the managers to choose a desirable one of the sets of perturbations for implementation by the group.

2. A method, comprising the steps of:
    storing into the memory of a digital computer a plurality of data structures describing suborganizations of an organization;
    storing into the computer memory a plurality of data structures describing respective tasks to be performed by the organization under management by the one or more managers, the task data structures describing managers' priority levels for the respective tasks;
    storing into the memory of a digital computer data structures describing employees of the organization, the employee data structures including data describing employee proficiency of specific employees for specific tasks from among the organization's tasks;
    in a processor of the digital computer, computing an allocation of employee data structures to the suborganization data structures based on the stored task priority data and stored proficiency data, the allocation reflecting a computed optimization of allocations, the computation:
        creating a number of trial allocations of employee data structures among suborganization data structures,
        computing a value of an objective function for the trial allocations of employee data structures among suborganization data structures, and
        choosing from among the trial allocations with best objective function, the objective function modeling the organization's ability to perform its highest priority tasks and at least one of the group consisting of:
            reduction of the organization's costs,
            in any reduction in force, recommend employees that are retirement-eligible,
            in any reduction in force, recommend employees that are near retirement,
            assignment of employees that have high proficiencies in high priority tasks with specific tasks that are of high priority,
    by computer, reporting the computed optimization of allocation to the managers.

3. The method of claim 2, further comprising the step of:
    in the memory of the computer, perturbing the data structures to reflect a change of a requirement imposed on the organization.

4. The method of claim 3, wherein:
    the perturbation includes a budget cut.

5. The method of claim 3, wherein:
    the perturbation includes a mission change.

6. The method of claim 3, wherein:
the perturbation includes an organizational restructure.

7. The method of claim 3, further comprising the steps of:
storing into the computer memory revisions to the a plurality of data structures describing perturbations to one or more of the organization's budget, the organizational structure among the suborganizations, assignment of tasks to organizations, or changes to the tasks assigned to the organization; and
repeating the computing an allocation of employee data structures to the suborganization data structures to reflect the revised data structures; and
by computer, reporting the revised computed optimization of allocation to the managers.

8. The method of claim 2, further comprising the steps of:
storing into the memory of a digital computer data describing staffing levels for the respective tasks, and management's assessment of performance levels for staff to perform the respective tasks; and
computing the figure of merit based at least in part on employee's proficiency in tasks as compared to respective management assessment of performance levels for tasks.

9. The method of claim 2, further comprising:
storing into the computer memory a plurality of data structures describing respective tasks to be performed by the organization under management by the one or more managers, the task data structures being arranged in a hierarchical arrangement of the tasks as described by management.

10. The method of claim 2, further comprising the step of:
comparing managers' requested levels of competence with staff assessments of proficiency to identify gaps where manager requested levels substantially exceed staff assessments.

11. The method of claim 10, further comprising the step of:
weighting levels in the gaps by criticality of the competency, and reporting the gaps to managers based on the weighted levels.

12. The method of claim 10, further comprising the step of:
by computer, recommending training for specific competencies of specific staff members based on the weighted gap levels.

13. The method of claim 2, further comprising the step of:
computing the value of the objective function based at least in part on a probability of failure of a high-priority task of the organization.

14. The method of claim 7, further comprising the step of:
computing the value of the objective function based at least in part on a probability of failure of a task of the organization, weighted by priority of that task.

15. The method of claim 2, further comprising the step of:
by computer, querying managers of the organization to obtain the managers' requested levels for a plurality of resources for the organization, including requested levels of proficiency for a plurality of competencies for performance of tasks of the organization, and storing the managers' requested levels in the memory of the computer;
by computer, querying staff members of the organization to obtain staff assessments of the degree to which the organization meets the requested levels of the resources, including the degree to which staff have proficiency in the competencies, and storing the staff assessments in the memory of the computer;
by computer, comparing the managers' requested levels and the staff assessments to identify mismatches between the requests and assessments; and
by computer, reporting the mismatches to the managers.

16. A computer system, comprising:
a processor;
a memory, the memory having stored therein instructions programmed to cause the processor to:
store into the memory a plurality of data structures describing suborganizations of an organization;
store into the memory a plurality of data structures describing respective tasks to be performed by the organization under management by the one or more managers, the task data structures describing managers' priority levels for the respective tasks;
store into the memory data structures describing employees of the organization, the employee data structures including data describing employee proficiency of specific employees for specific tasks from among the organization's tasks;
compute an allocation of employee data structures to the suborganization data structures based on the stored task priority data and stored proficiency data, the allocation reflecting a computed optimization of allocations, the computation:
creating a number of trial allocations of employee data structures among suborganization data structures,
computing a value of an objective function for the trial allocations of employee data structures among suborganization data structures, and
choosing from among the trial allocations with best objective function, the objective function modeling the organization's ability to perform its highest priority tasks and at least one of the group consisting of:
reduction of the organization's costs,
in any reduction in force, recommend employees that are retirement-eligible,
in any reduction in force, recommend employees that are near retirement,
assignment of employees that have high proficiencies in high priority tasks with specific tasks that are of high priority,
by computer, reporting the computed optimization of allocation to the managers.

17. The computer system of claim 16, the programs being further programmed to cause the processor to:
in the memory of the computer, perturbing the data structures to reflect a change of a requirement imposed on the organization.

18. The computer system of claim 17, wherein:
the perturbation includes a budget cut.

19. The computer system of claim 17, wherein:
the perturbation includes a mission change.

20. The computer system of claim 17, wherein:
the perturbation includes an organizational restructure.

21. The computer system of claim 16, the programs being further programmed to cause the processor to:
storing into the memory of a digital computer data describing staffing levels for the respective tasks, and management's assessment of performance levels for staff to perform the respective tasks; and
computing the figure of merit based at least in part on employee's proficiency in tasks as compared to respective management assessment of performance levels for tasks.

22. The computer system of claim 16, the programs being further programmed to cause the processor to:

store into the computer memory a plurality of data structures describing respective tasks to be performed by the organization under management by the one or more managers, the task data structures being arranged in a hierarchical arrangement of the tasks as described by management.

23. The computer system of claim 16, the programs being further programmed to cause the processor to:

comparing managers' requested levels of competence with staff assessments of proficiency to identify gaps where manager requested levels substantially exceed staff assessments.

24. The computer system of claim 23, the programs being further programmed to cause the processor to:

weight levels in the gaps by criticality of the competency, and reporting the gaps to managers based on the weighted levels.

25. The computer system of claim 23, the programs being further programmed to cause the processor to:

by computer, recommending training for specific competencies of specific staff members based on the weighted gap levels.

26. The computer system of claim 16, the programs being further programmed to cause the processor to:

computing the value of the objective function based at least in part on a probability of failure of a high-priority task of the organization.

27. The computer system of claim 16, the programs being further programmed to cause the processor to:

computing the value of the objective function based at least in part on a probability of failure of a task of the organization, weighted by priority of that task.

* * * * *